US011948097B1

(12) United States Patent
Stark

(10) Patent No.: US 11,948,097 B1
(45) Date of Patent: Apr. 2, 2024

(54) SYSTEM AND METHOD FOR VIEWING AN EVENT

(71) Applicant: Stark Focus LLC, Brighton, MI (US)

(72) Inventor: Daniel John Stark, Brighton, MI (US)

( * ) Notice: Subject to any disclaimer, the term of this patent is extended or adjusted under 35 U.S.C. 154(b) by 314 days.

(21) Appl. No.: 16/846,407

(22) Filed: Apr. 13, 2020

Related U.S. Application Data

(60) Provisional application No. 62/832,580, filed on Apr. 11, 2019.

(51) Int. Cl.
*G06N 5/04* (2023.01)
*G06N 20/00* (2019.01)
(52) U.S. Cl.
CPC ............... *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS

| | | | |
|---|---|---|---|
| 2016/0098941 A1* | 4/2016 | Kerluke | G09B 19/0038 700/91 |
| 2017/0118539 A1* | 4/2017 | Lokshin | G11B 27/28 |
| 2017/0206932 A1* | 7/2017 | Kawaguchi | H04N 9/87 |
| 2017/0255826 A1* | 9/2017 | Chang | A63F 13/60 |

\* cited by examiner

*Primary Examiner* — Ghazal B Shehni

(57) ABSTRACT

A system (300) and method (900) for viewing an event (80). The system (300) can enhance the experience of the viewer (120) in a variety of different ways. A machine learning module (534) can be used to train the system (300) to correctly identify the participants (110) of an event (80) from an image (728) or video (729) captured at the event (80).

20 Claims, 33 Drawing Sheets

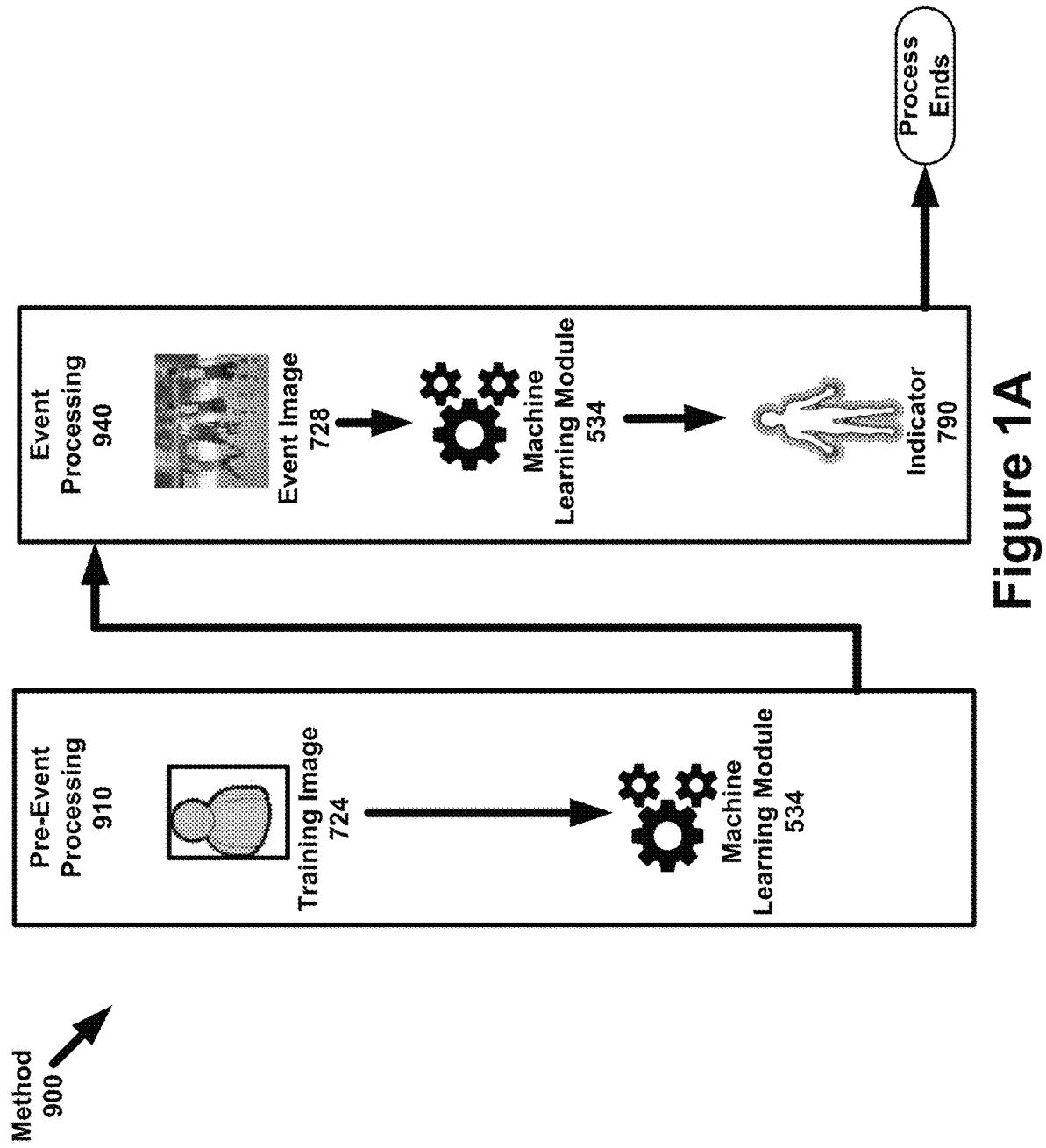

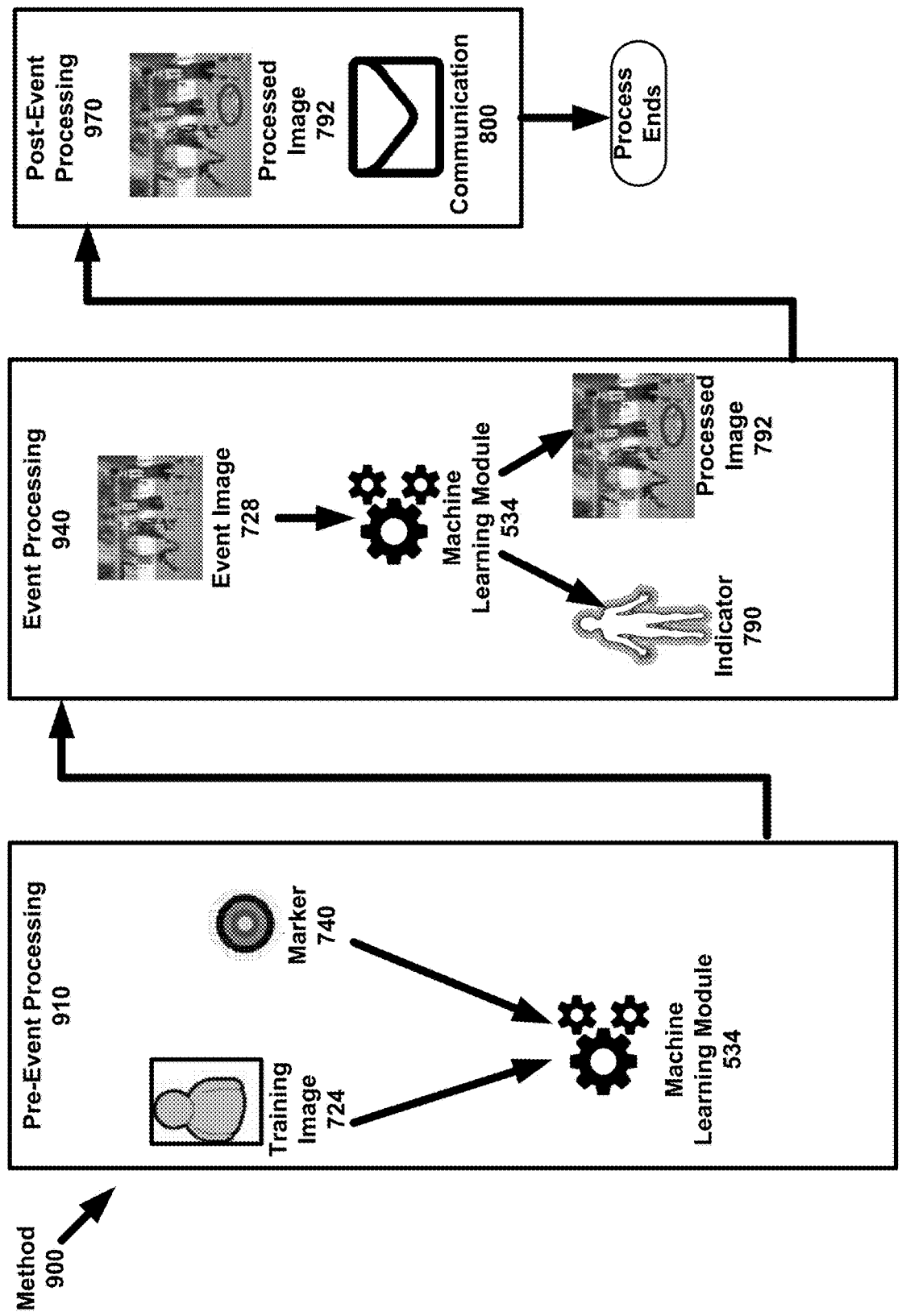

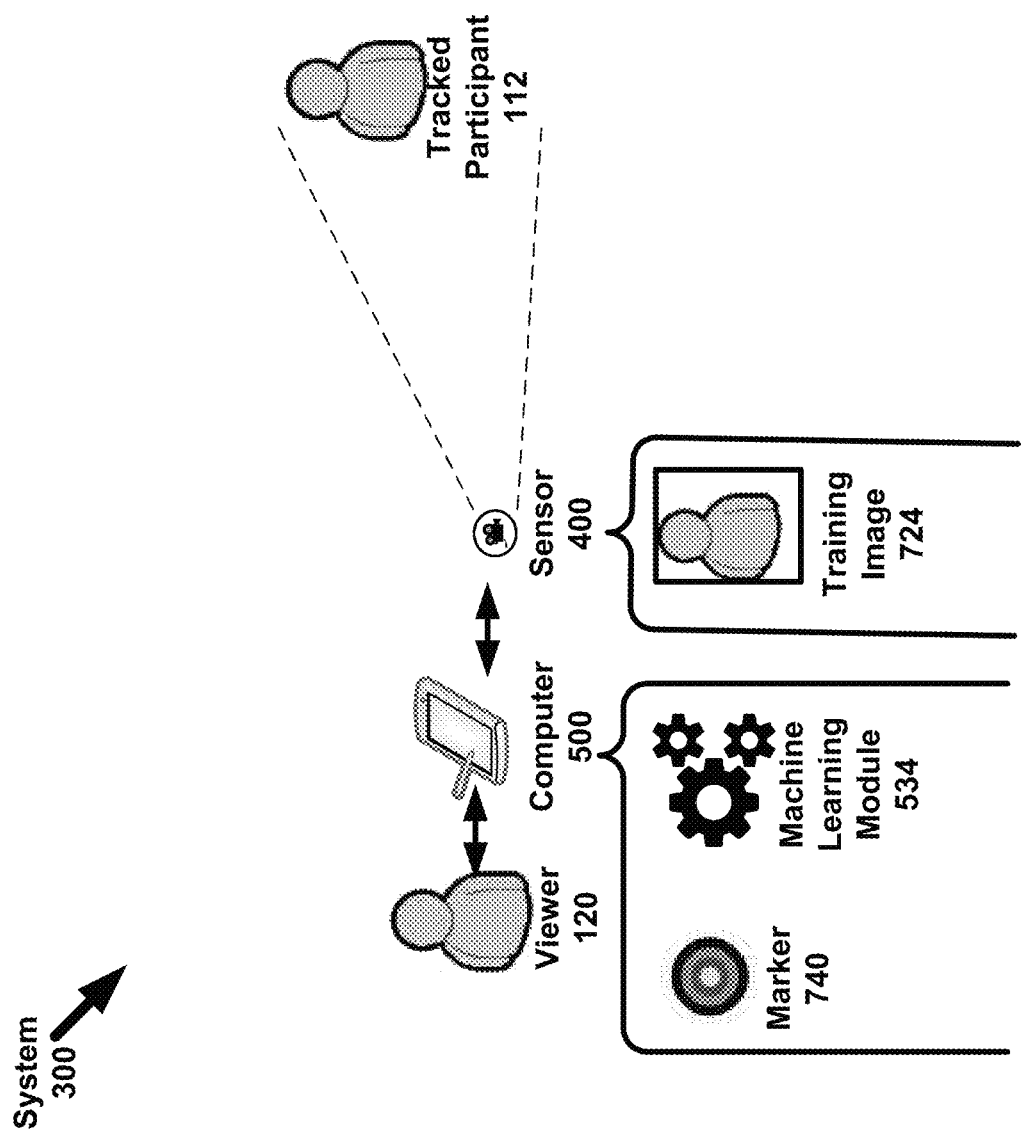

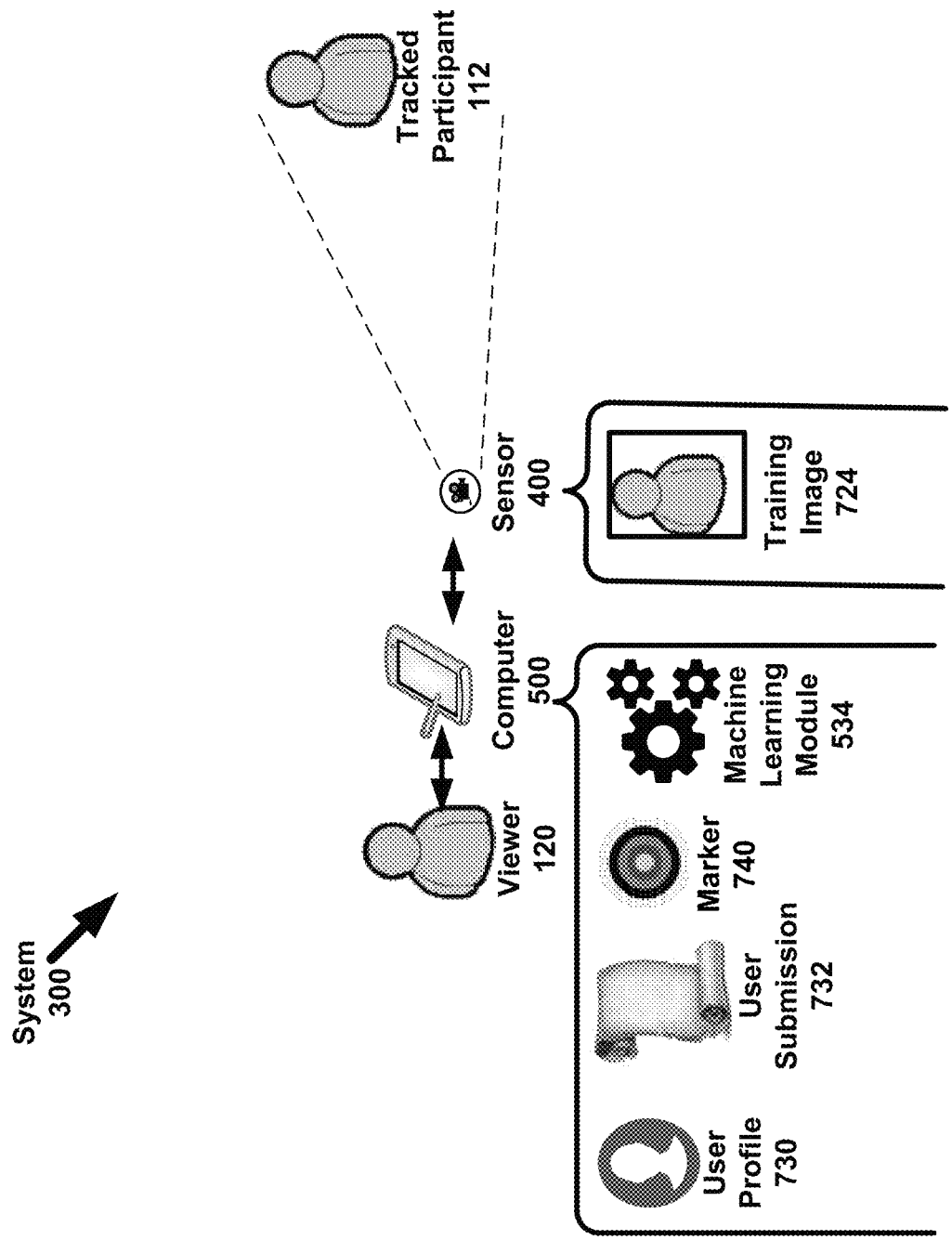

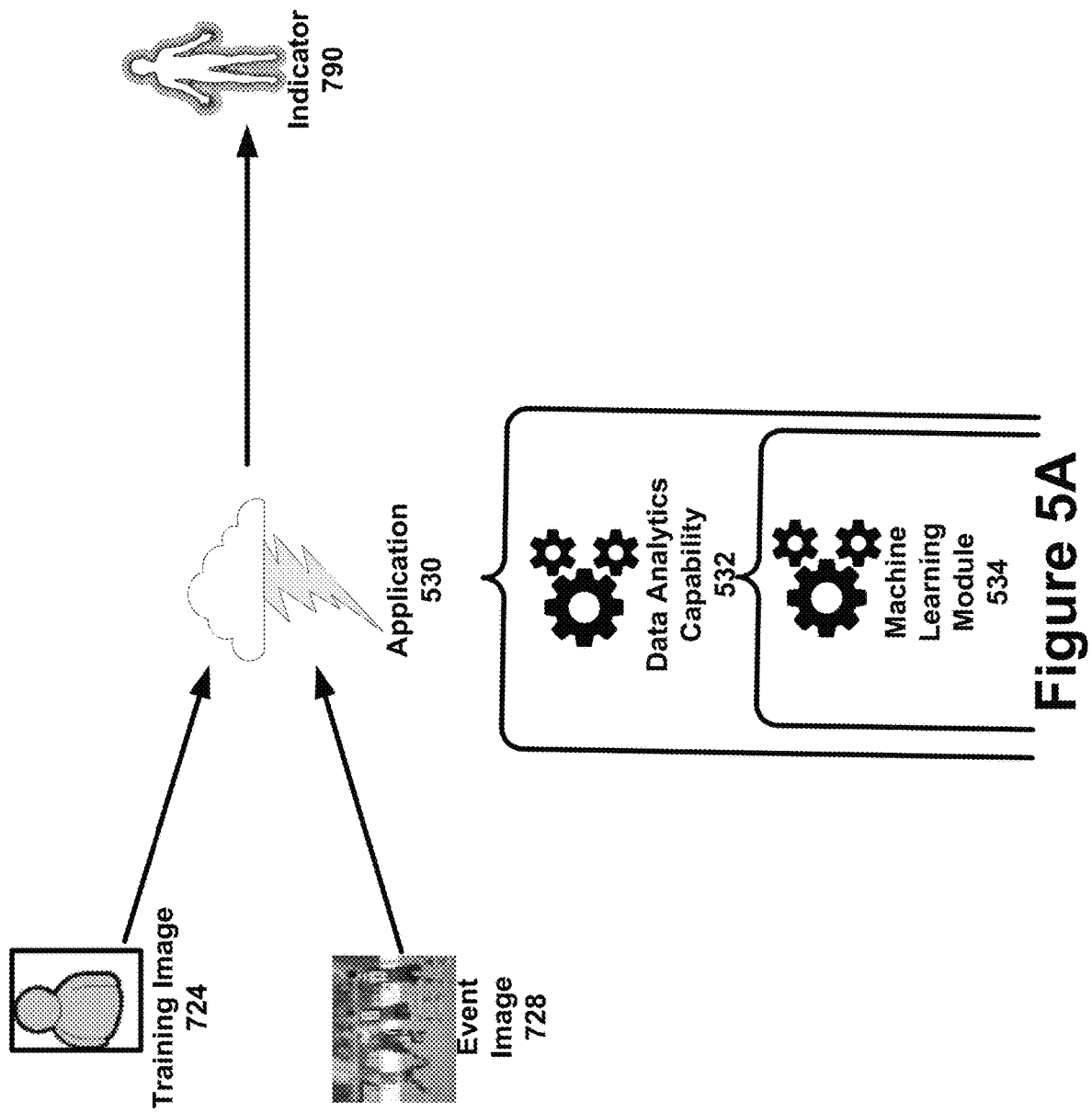

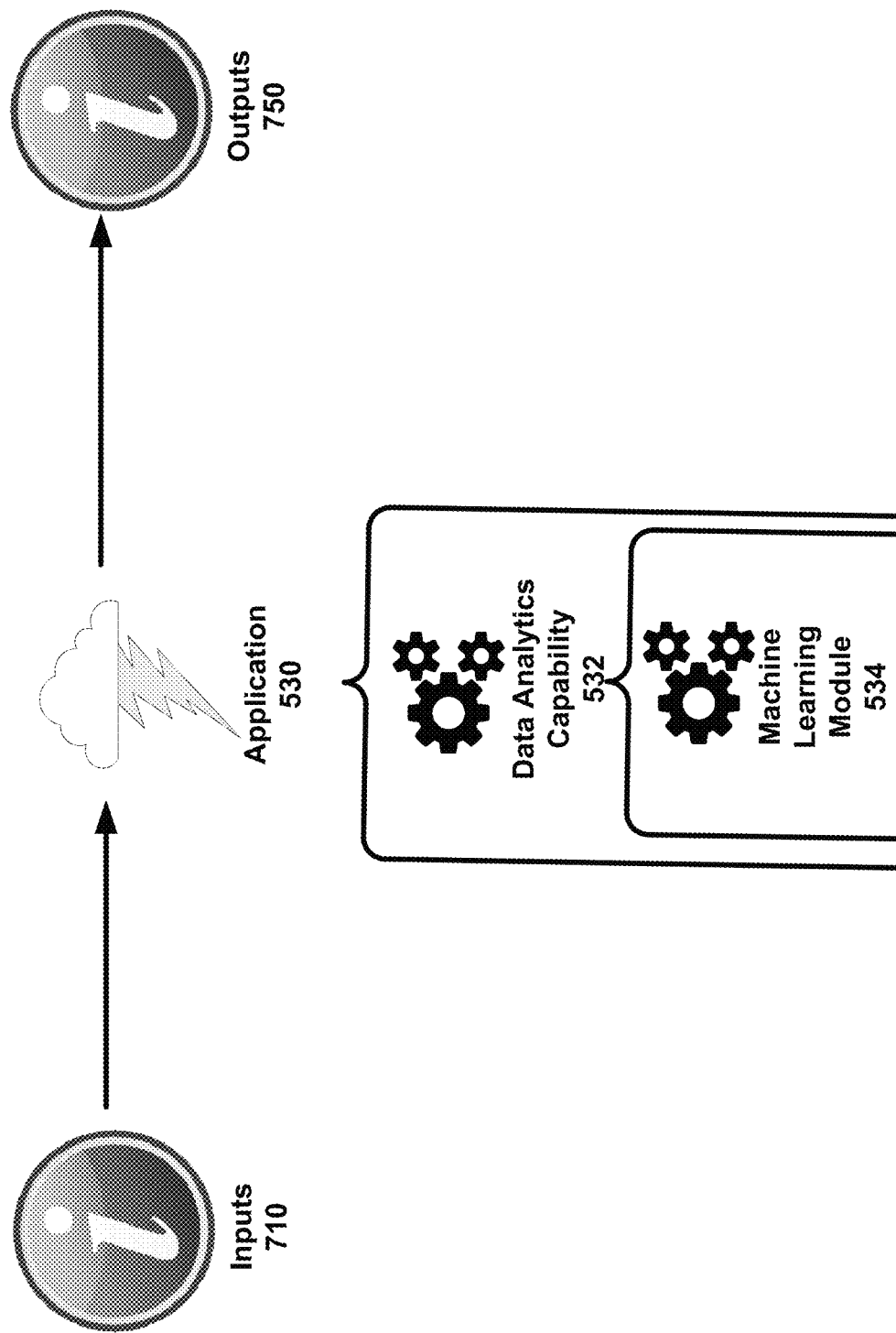

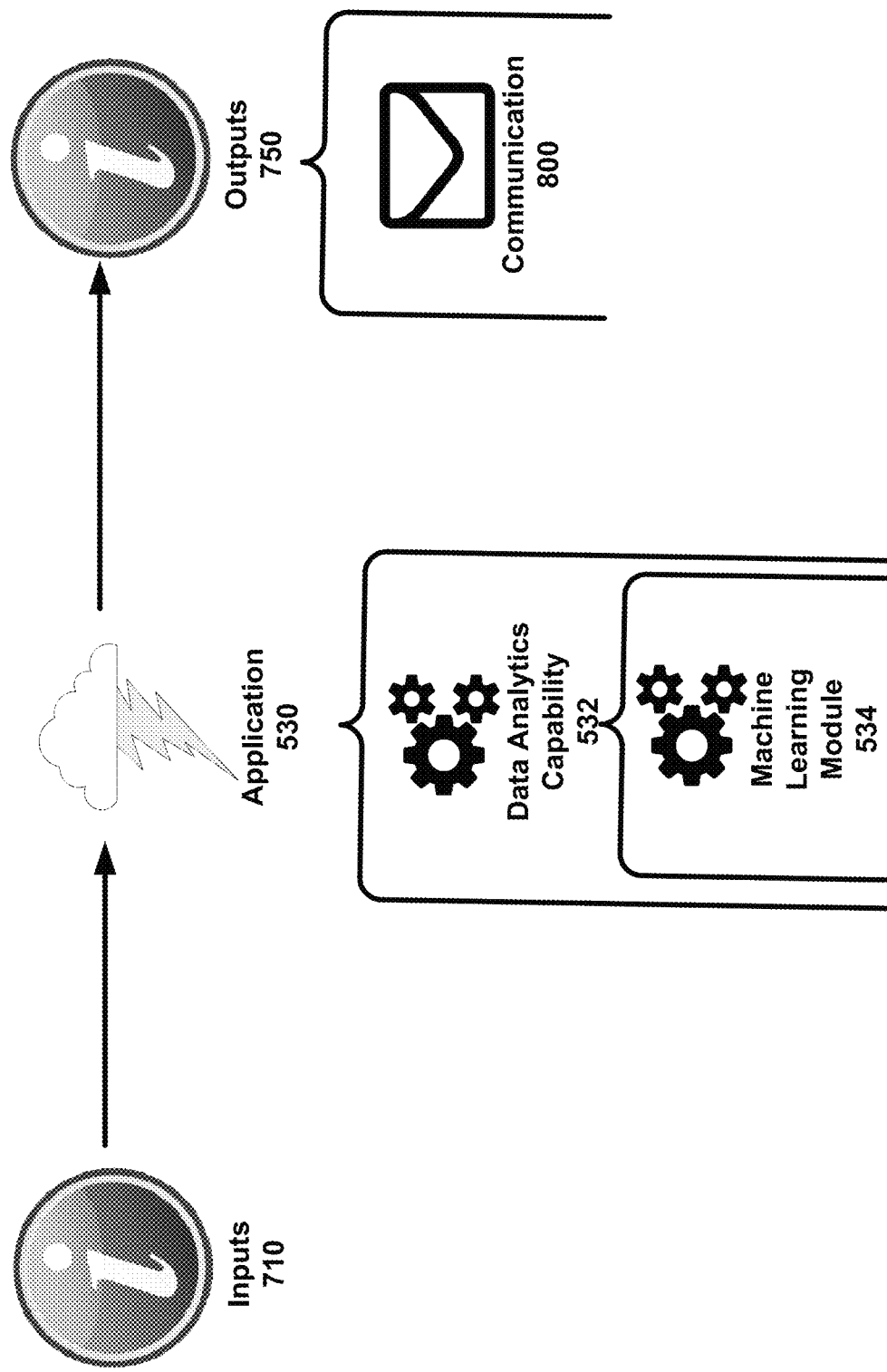

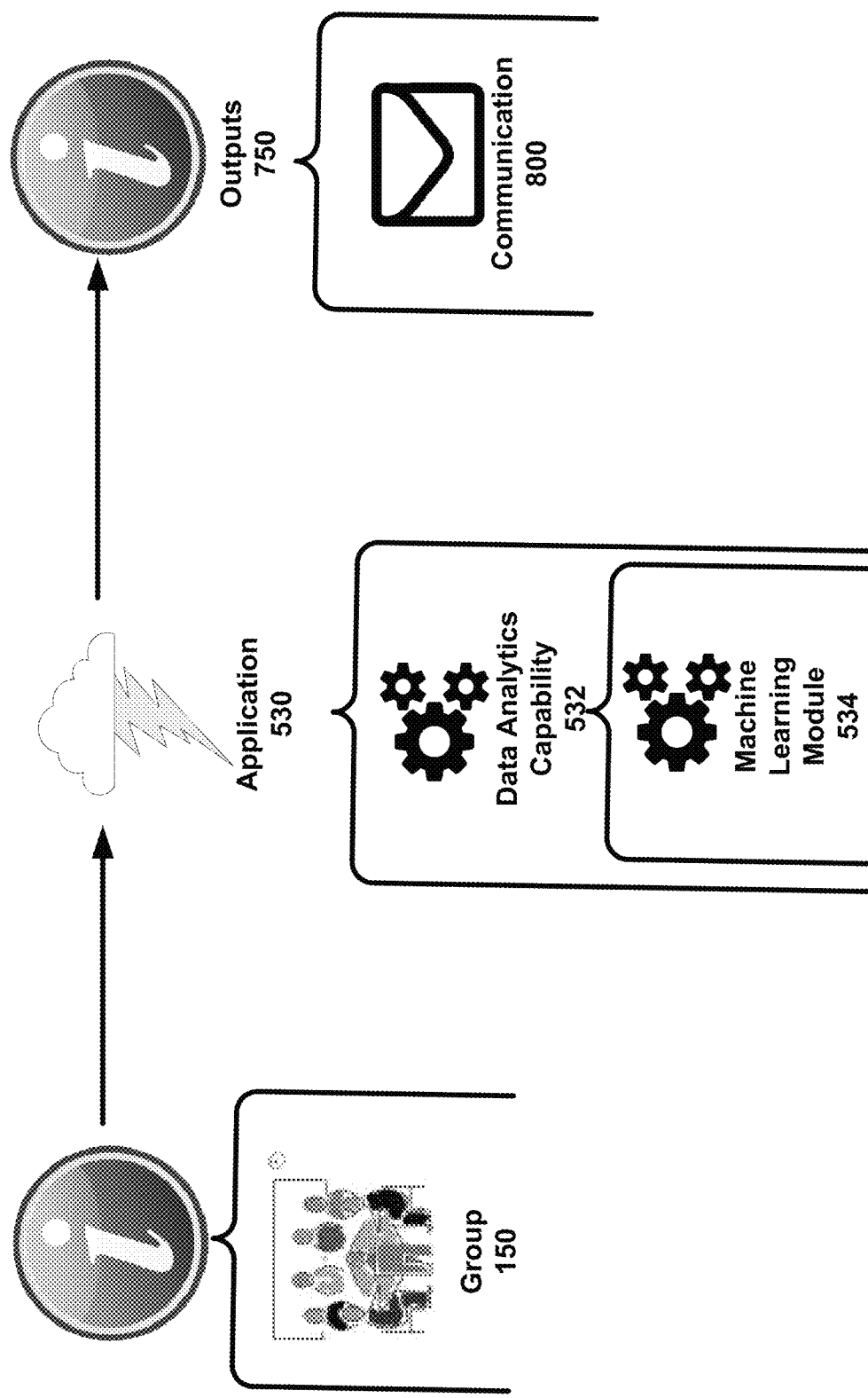

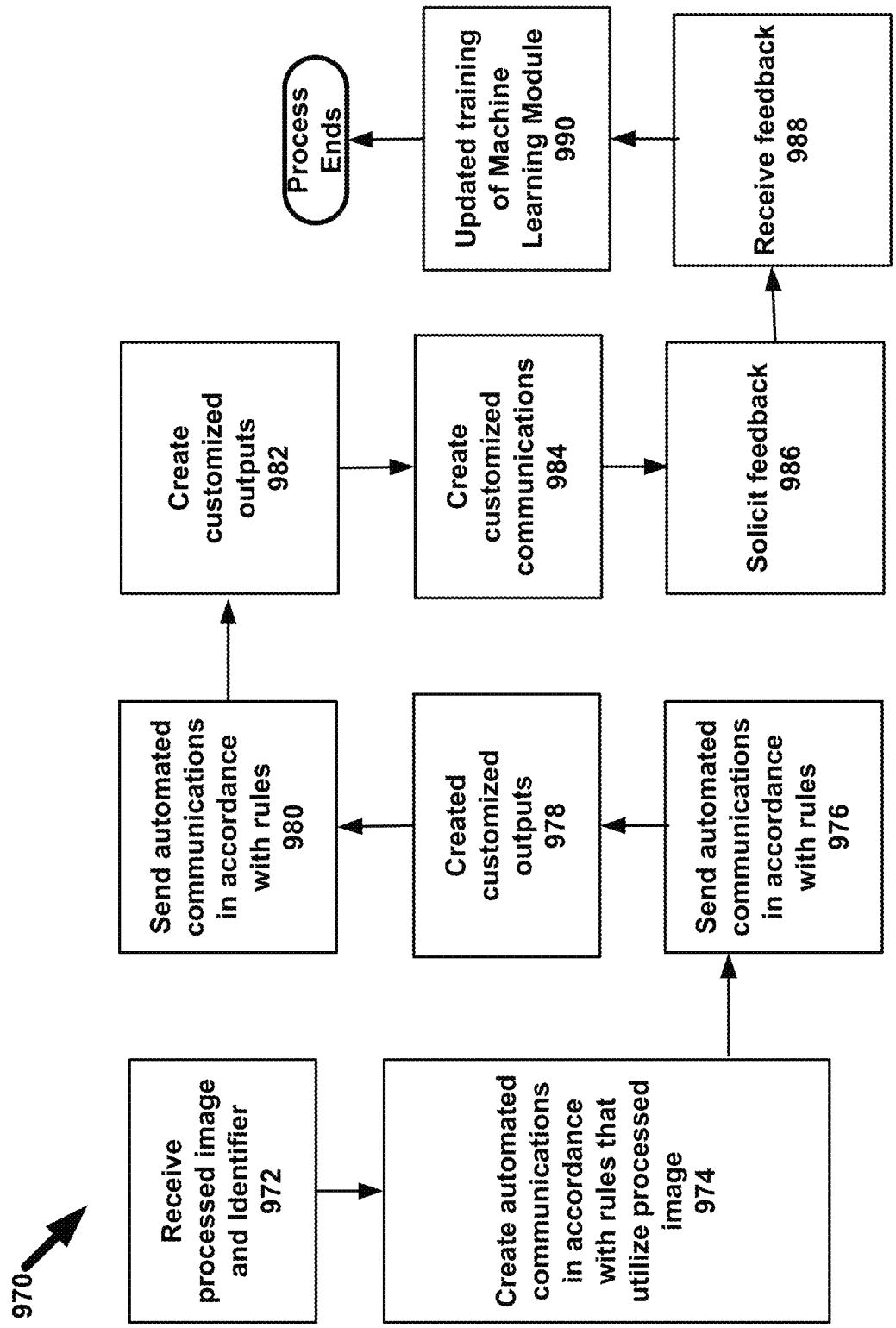

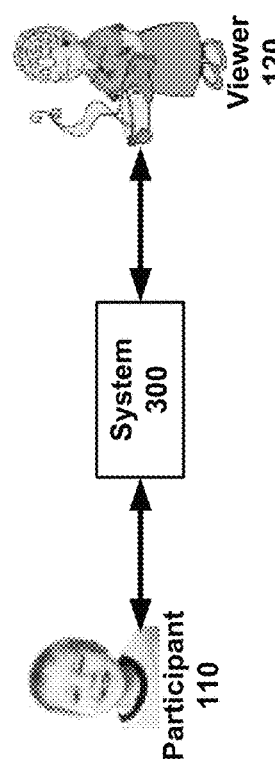
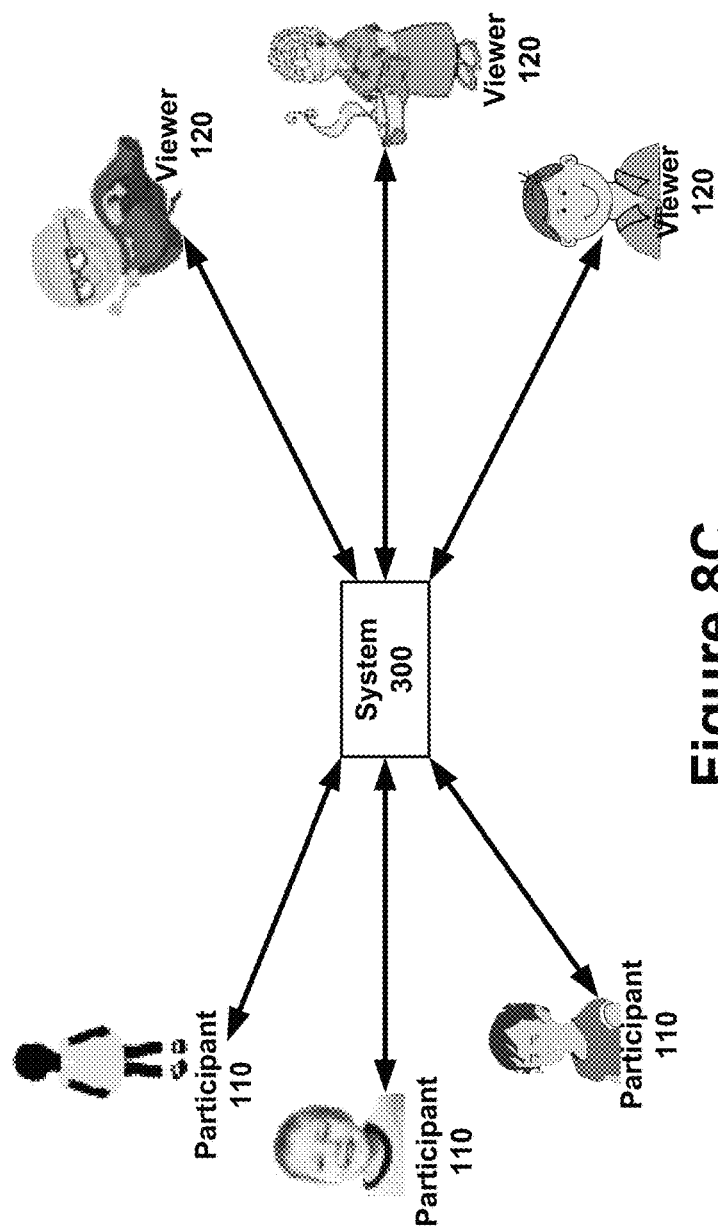

SYSTEM AND METHOD FOR VIEWING AN EVENT

RELATED APPLICATIONS

This patent application claims priority to incorporates by reference in its totality, the contents of provisional patent application titled "SYSTEM AND METHOD FOR PROVIDING DATA TO A VIEWER THAT RELATES TO A PARTICIPANT OF AN EVENT" (Ser. No. 62/832,580) that was filed on Apr. 11, 2019.

BACKGROUND OF THE INVENTION

The invention relates generally to the systems and methods for processing data. More specifically, the invention is a system and method (collectively, the "system") for viewing an event.

The ways human beings watch professional sports, news, concerts, and other events have changed substantially over the years. When watching football, the distance required for a first down is displayed with a computer-generated line marking that distance. When watching hockey, computer effects are used to make it easier for viewers to follow the movement of the puck. Sporting event broadcasters frequently make reference to statistics, replays, and player backstories. When watching news broadcasts, a ticker at the bottom of the screen is often used to communicate late breaking news or even commentary pertaining to the even occurring on the screen. At least one prominent online streaming service provides clickable information about actors on the screen in the current scene and selective comments from critics and fans. Technology has changed the viewing experience with respect to many different events.

Mobile technology such as smart phones and social media have had a dramatic impact on how human beings interact with each other. However, they have not had a dramatic impact on how attendees of events view those events. There are many contexts in which the attendee viewing an event would benefit from a system to assist the viewer to engage with the event. Such a system can help the viewer understand, enjoy, and/or memorialize an event. The system was originally conceptualized as a means to help parents and grandparents more actively follow, appreciate, and celebrate the events in which their children and grandchildren participate. This can be particularly desirable in the case of children participating in events at which parents, grandparents, and other family members the deliver audience at an event would benefit from the delivery of additional information relating to the event. This can be true whether the event is an athletic competition (such as a football, baseball, soccer, hockey, or other type of game), an artistic performance (such as a concert, dance recital, opera, play, or other type of artistic performance), or other types of events. In many cases, the audience members of an event (the "viewers") may even lack a basic understanding of the event, and that lack of understanding can negatively impact their capacity to enjoy the event.

Further impeding the enjoyment of the audience at event can be the inability of a particular viewer to follow the actions of a particular participant. For example, grandparents attending an event in which their grandchild is a participant may be primarily interested in their grandchild, rather than the event as a whole. Despite the focused interest of such viewers, their lack of familiarity with the type of event can substantially impede their ability to perceive their grandchild (i.e. the participant of interest to the viewers).

A system could enable viewers of such events to access relevant data, better following the activities of the participants of the event, and better capture photos, videos, and sound recordings of such activities in ways that can enhance the relationships and enjoyment of participants and viewers alike.

It would be desirable for a system to provide viewers with additional information about an event while watching the event. It would be desirable in certain circumstances for a system to allow viewers to have such information focus on a particular participant. It would also be desirable for such a system to facilitate the memorializing of the highlights of the event, and to share those mementos with the appropriate audience of people.

The system is described in greater detail below in the Summary of the Invention section.

SUMMARY OF THE INVENTION

The invention relates generally to the systems and methods for processing data. More specifically, the invention is a system and method (collectively, the "system") for viewing an event.

The system be implemented in a variety of different embodiments. The system was originally conceived to provide grandparents with an enhanced experience when attending the sporting events of their grandchildren. Such fans may not understand the rules of the game and may even have problems following their favorite player on the field. The system can be implemented in such a manner as to transform a conventional smart phone or tablet computer into a valuable and enjoyable source of information.

The system can use a data analytics capability such as a machine learning module that can be trained to capture photographs and video of particular participants while provider the viewer with relevant information. The system can also help viewers to memorialize such events through the creation and posting of presentations on social media.

The outputs of the system can be created from a variety of inputs, including sensor data, user profiles, processing rules, and user submissions. The outputs of the system can include a potentially wide range of information displayed in various presentation formats and communicated to viewers in a wide range of different communications. The outputs of the system can include various statuses and certifications that are enabled by the automated processing of the system.

In a preferred embodiment, the system uses machine learning (data analytics) to enable a computer to learn the best ways to distinguish a tracked/targeted participant from the other participants at an event. This can be done by capturing baseline sensor readings that are specific to the tracked/targeted participant. The system can train itself to identify which attributes in the baseline sensors readings are the best attributes to look for in distinguishing the tracked/targeted participant from other participants at the event. Such an embodiment of the system can display a digitally enhanced video of the event, with an indicator showing the viewer where the tracked/tracked participant is located.

The system can be better understood by referencing the drawings discussed below.

BRIEF DESCRIPTION OF THE DRAWINGS

Different examples of various attributes, components, and configurations that can be incorporated into the system are illustrated in the drawings described briefly below. No patent application can expressly disclose in words or in drawings, all of the potential embodiments of an invention. In accordance with the provisions of the patent statutes, the principles, functions, and modes of operation of the system are illustrated in certain preferred embodiments. However, it must be understood that the system may be practiced otherwise than is specifically illustrated without departing from its spirit or scope.

FIG. 1A is a process flow diagram illustrating an example of a method in which a machine learning module is trained using a training image of a specific participant, and the machine learning module is subsequently used to identify that specific participant in an image captured at an actual event.

FIG. 1C is a process flow diagram illustrating an example of a method similar to the method of FIG. 1B, except that a post-event process of communicating the processed image is performed.

FIG. 2B is a block diagram illustrating an example of a system similar to the system of FIG. 2A, except that a marker is used to help train the machine learning module.

FIG. 2C is a block diagram illustrating an example of a system similar to the system of FIG. 2B, except that a user profile and a user submission are also used to help train the machine learning module.

FIG. 5A is an input-output diagram illustrating an example of an indicator being identified by an application through use of a training image used to train the machine learning module and an event image captured at the event.

FIG. 5B is an input-output diagram illustrating an example of a wide variety of inputs that can be used to selectively modify a wide variety of outputs.

FIG. 5C is an input-output diagram similar to the example of FIG. 5B, except that the outputs include communications sent out through the use and operation of the system.

FIG. 5D is an input-output diagram similar to the example of FIG. 5C, except that the inputs can be aggregate based on groups.

FIG. 6C is a flow chart diagram illustrating an example of a post-event process that can be performed using the system.

FIG. 8B is a block diagram illustrating an example of a system as a means to facilitate interactions between a participant and a viewer.

FIG. 8C is a block diagram illustrating an example of a system used by a variety of different viewers and participants to interact with each other.

Figure 1B:
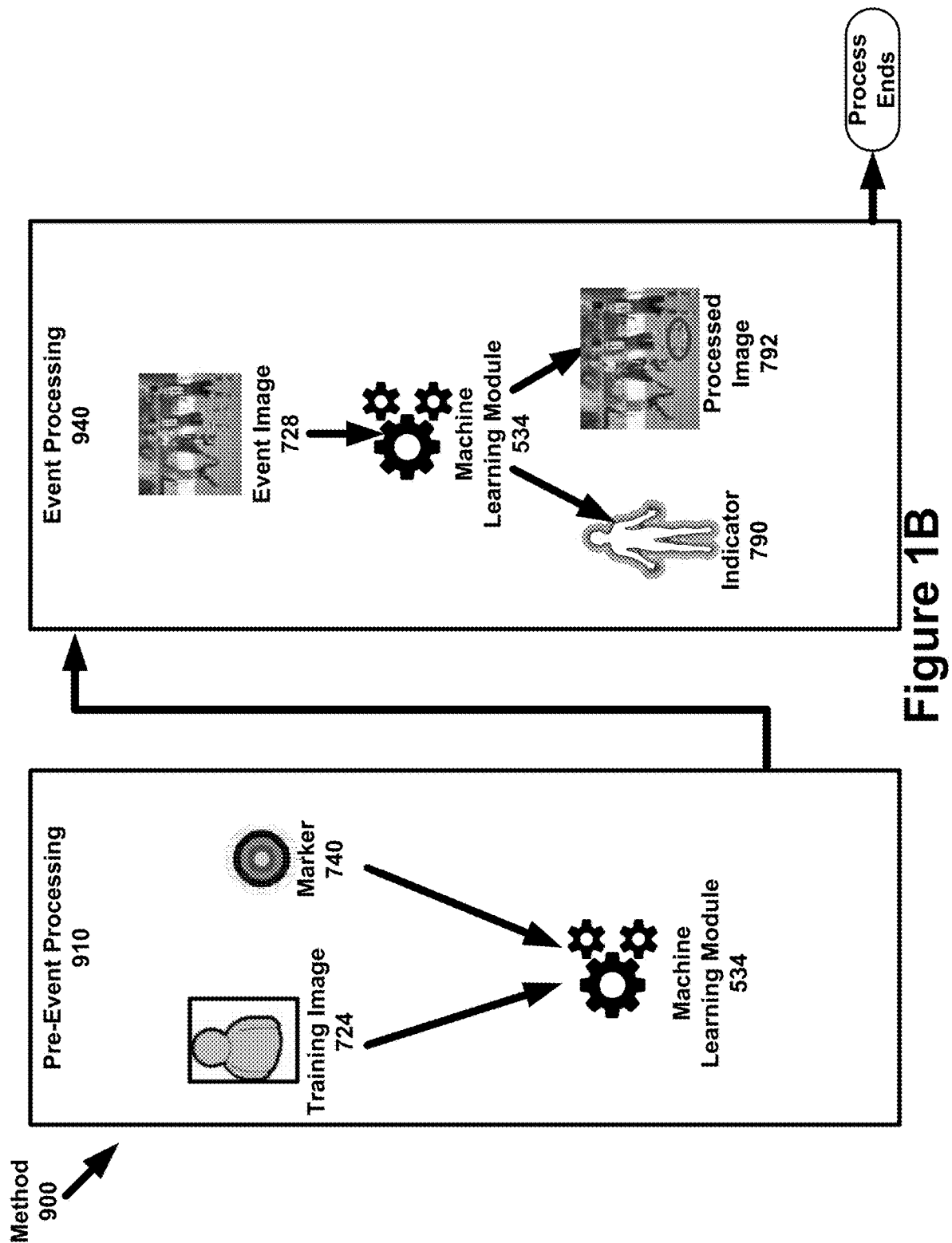
FIG. 1B is a process flow diagram illustrating an example of a method similar to the method of FIG. 1A, except that a marker is used in conjunction with the training image to train the machine learning module, and the machine learning module is used to create a processed image along with the indicator of the participant from the event image.

The system can be further understood by the text description provided below in the Detailed Description section.

DETAILED DESCRIPTION

The invention relates generally to the systems and methods for processing data. More specifically, the invention is a system and method (collectively, the "system") for viewing an event.

The system can be implemented in a wide variety of different ways to enhance the manner in which a viewer interacts with an event. The system was originally conceived in the context of helping family members to understand a sporting event in which a child or grandchild was participating, and to help them identify where on the field their child or grandchild is. However, the system can be implemented in a wide variety of different ways to enhance to viewing experience of a wide variety of events.

1. Locating the participant in an image or video of the event. This can be done live, or with respect to images or video of the event after it is concluded. A training image of the participant can be used to train a machine learning module to find the participant within actual photos and/or video of the event. Markers and other forms of inputs can be used to increase the "learning" of the machine learning module.

2. Relevant statistics and information. While watching a son or daughter play a particular position, the system can be used to convey general information about the sport and position to the viewer. In some embodiments, the system can be implemented such that statistics specific to the game being viewed and the participant being tracked are conveyed to the viewer by the system.

3. Post-event communications. As the system can assist viewers capture images of their desired participant, those images can then be modified and used in communications, such as postings on social media, congratulations for teammates, etc.

4. Groups. Information sharing for the purposes of communications and training of the machine learning module can benefit by the ability of users to form groups. An entire family can be given the ability to follow their family member participant. An entire team can be given the ability to follow all of the players on the team. An entire league can be given the ability to follow all events within the league. This can greatly enhance the social aspects of the events, as well as to increase the quantity of data for training purposes.

5. Third-Party Data Sources. The system can be implemented to incorporate data from outside the system. Such data can relate to the organizing entity of the events, sponsors, the particular type of activity, etc. Such data can also be helpful for training purposes.

6. Remote and Recorded Viewing. The system can be used by viewers to view events remotely or to view events as recorded video after the event is over. Participants can view such footage of events to improve their skills for the next event.

7. Sensors. A wide range of different sensors can be integrated by the system. In some embodiments, the only sensor is the camera in a smart phone used by a viewer. In other embodiments, sensors can be placed at different locations and even different players. Non-visual sensors such as microphones can be used in addition to cameras and video cameras.

8. Integration with other technologies. The system can be implemented in a wide variety of different information technologies and integrated with different technologies. For example, platforms for the postings of videos, pictures, and audio recording be integrated with the processing of the system.

I. GLOSSARY OF TERMS

All terminology associated with an element number is defined in Table 1 below.

TABLE 1

| Number | Name | Definition/Description |
|---|---|---|
| 80 | EVENT | An activity involving one or more participants 110. Events 80 can include but are not limited to a variety of competitions 81 and performances 86. |
| 81 | Competition | An event 80 in which participants 110 compete against each other. Competitions 81 can include but are not limited to athletic competitions 82 and non-athletic competitions 85. |
| 82 | Athletic Competition | A competition 82 where the participants 110 are scored on the basis of athletic metrics. Sports are common example of athletic competition. Athletic competitions 82 can include but are not limited to team competitions 83 and individual competitions 84. |
| 83 | Team Competition | An athletic competition 82 where participants 110 participate as part of competing teams. The system 300 was originally conceptualized to be used in the context of team sports, such as football, soccer, baseball, basketball, lacrosse, hockey, field hockey, softball, tennis, swim meets, cheer leading, dance competitions, gymnastics, etc. |
| 84 | Individual Competition | An athletic competition 82 where the participants 110 compete as individuals, such as skiing, tennis, golf, figure skating, etc. |

TABLE 1-continued

| Number | Name | Definition/Description |
|---|---|---|
| 85 | Non-Athletic Competition | A competition 82 where the activity does not involve athletic prowess such as debate, forensics, chess, cooking, battle of the bands, etc. Non-athletic competitions 85 can be team competitions or individual competitions. |
| 86 | Performance | An event 80 where one or more participants 110 are not engaged in competing against each other. Examples of performances 86 can include concerts, theatrical productions, speeches, dances, exhibitions, etc. |
| 87 | Athletic Performance | A performance 80 where a participant 110 is engaging in a non-competitive activity involving athleticism. |
| 88 | Non-Athletic Performance | A performance 80 where a participant 110 is engaging in a non-competitive activity that does not involve athleticism. |
| 100 | USER | A human being interacting with the system 300. Types of users 100 include participants 110, viewers 120, administrators 130, and third-parties 140. Users 100 of the system 300 can be organized into various groups 150. |
| 110 | Participant | A user 100 who is participating in an event 80. By way of example, in the context of an event 80 that is an athletic competition, participants 110 are the athletes. |
| 112 | Tracked Participant | A participant 110 whom a viewer 120 uses the system 300 to identify within an event image or event video. A tracked participant 112 can also be referred to as a monitored participant 112. |
| 120 | Viewer | A user 100 who is not a participant 110 at an event 80, but who engages with the system 300 as an observer of the event 80. Viewers 120 interact with the system 300 in order to monitor/track the activities of participants 110. In many embodiments, only users 100 specifically authorized by the specific participant 110 can be viewers 120 of that participant 110. |
| 130 | Administrator | A user 100 who manages and operates the technology infrastructure that enables the functionality of the system 300. |
| 140 | Third-Party | A user 100 interacting with the system 300 who is not a participant 110, not a viewer 120, and not an administrator 130. Some embodiments of the system 300 can allow third-parties 140 such as businesses, non-profits, religious organizations, government agencies, and other types of individuals and organizations to interact with groups 150, viewers 120 and potentially even specific individual participants 110. |
| 150 | Group | An association or assemblage of two or more users 100. Groups 125 can be based on families, where the participant 110 is a family member and there is one or more viewer 120 who shares a familial relationship with that participant 110. Groups 124 can be based on |
| 152 | Family Group | A group 150 of users 100 based on a familial relationship. By way of example, the system 300 can process data 700 in such a manner that recognizes the family relationship between a child playing on a sports team (the participant 110), and the parents and grandparents of the child (the viewers 120). |
| 154 | Team Group | A hierarchical group 150 that is comprised of family groups 152 relating to the players associated with a team. |
| 156 | League Group | A hierarchical group 150 that is comprised of the team groups 154 associated with a league, and the family groups 152 associated with the various teams. |
| 158 | Ad-Hoc Group | A non-hierarchical group 150 comprised of users 100 who chose to be in a group 150. By way of example, two players on a team can chose to be part of an ad-hoc group 158 comprised of the two players and their respective family groups 152. |
| 200 | LOCATION | A place or position in the physical world. Locations 200 are either local locations 210 or remote locations 220 relative to the location of the applicable event 80. |

TABLE 1-continued

| Number | Name | Definition/Description |
|---|---|---|
| 210 | Local Location | A location 210 that is where the event 80 is taking place (such as a playing field where participants 110 play), or adjacent to where the even 80 is taking place (such as the stands where viewers 120 sit) |
| 220 | Remote Location | A location 200 that is not a local location 210. In many embodiments of the system 300, data 700 captured and created by the system 300 can be accessed from remote locations 220. |
| 300 | SYSTEM | An aggregate configuration of one or more sensors 400, one or more computers 500, and data 700 relating to at least one participant 110 that is accessed by at least one viewer 120. Different embodiments of the system 300 can utilize different information technology configurations and platforms. |
| 310 | Stand Alone System | A system 300 implemented in the context of a single computer 500 typically a mobile computer such as a tablet or smart phone. |
| 320 | Networked System | A system 300 implemented using more than one computer 500 and one more networks 600. |
| 400 | SENSOR | A device that enables the capturing of information, i.e. data 700. In many embodiments, viewers 120 at an event 80 will utilize a client device 502 with a camera 430 to interact with the system 300. from a participant 110 and/or local location 210. Some sensors 400 are attached to a participant 110 and provide for the capture of sensor readings 720 specific to that participant 110. Other sensors 400 such as a video camera 432 capturing a sporting event of multiple participants 110 relate to a specific local location 210. |
| 402 | Person-Based Sensor | A sensor 400 that captures information from a specific participant 110. A person-based sensor 402 can be attached to the particular participant 110. |
| 404 | Location-Based Sensor | A sensor 400 that captures information from a specific local location 210. An example of a location-based sensor 404 is a high definition video camera taking video images of the event 80. |
| 406 | User-Based Sensor | A sensor 400 that is under the direct control of a user 100. In the context of a viewer 120 interacting with the system 300 through a smart phone (a type of client device 502) that includes a camera 430), the user-based sensor 406 is the camera 430 in the smart phone. |
| 410 | Tracking Sensor | A sensor 400 that provides for the capture of position, velocity, and/or acceleration information. |
| 420 | Microphone | A sensor 400 that provides for the capture of information in the form of sound. |
| 430 | Camera | A sensor 400 that provides for the capture of information in the form of a visual image. |
| 432 | Video Camera | A type of camera 430 that provides for rapidly and repeatedly capturing visual images such that the attributes of movement over time are conveyed in a realistic manner. |
| 440 | Metric Sensor | A sensor 400 that provides for the capture of objective measurements, such as force of impact, temperature, etc. |
| 500 | Computer | An electronic device for storing and processing data 700. Computers 500 typically include one or more processors 510, one or more interfaces 520 through which a user 100 can interact, one or more applications 530 that can be run on the computer 500, one or more storage components 540 such as a hard drive for storing data 700, and one or more network adapters 550 for connecting to one or more networks 600. |
| 502 | Client-Device | A computer 500 operated by an individual user 100. Common examples of client devices include cell phones, smart phones, tablet computers, laptop computers, and desktop computers. |
| 508 | Server | A computer 500 that enables one or more client-devices 502 to access the system 300. |
| 510 | Processor | Often referred to as a CPU or central processing unit, a small chip or similar device that is capable of running a software application 530. |

TABLE 1-continued

| Number | Name | Definition/Description |
|---|---|---|
| 520 | Interface | The collective means by which a user 100 can interact with a computer 500. Common examples of interfaces include graphical user interfaces, such as web pages. |
| 525 | Display or Screen | A screen or monitor that provides for the display of data 700. On some computers 500 such as a smart phone or tablet, the display 525 is integral to the computer 500. In other embodiments, the screen 525 can be a separate device from the other components of the computer 500. |
| 530 | Application | A computer program that consists of instructions performed by the processor 510. In many embodiments of the system 300, the applications 530 will include data analytic capability 532. |
| 532 | Data Analytics Capability or DAC | A type of function which can also be referred to as machine learning 532. Machine learning 532 is the use of algorithms and statistical models that computer systems use to effectively perform a specific task without using explicit instructions, relying on patterns and inference instead. It is seen as a subset of artificial intelligence. The effectiveness and power of DAC 532 can benefit from larger data sets. In some embodiments, the system 300 can utilize data 700 originating beyond a particular participant 110 to derive data 700 to a particular participant 110. |
| 534 | Machine Learning Module | A module or computational platform where algorithms are automatically used and improved through experience in their application. It is seen as a subset of artificial intelligence. Machine learning algorithms build a mathematical model based on sample data, known as "training data", in order to make predictions or decisions without being explicitly programmed to do so. Machine learning algorithms are used in a wide variety of applications, such as email filtering and computer vision, where it is difficult or infeasible to develop conventional algorithms to perform the needed tasks. The use of machine learning to identify an object or person in one image within another image is known in the prior art. Machine learning is closely related to computational statistics, which focuses on making predictions using computers. The study of mathematical optimization delivers methods, theory and application domains to the field of machine learning. Data mining is a related field of study, focusing on exploratory data analysis through unsupervised learning. In its application across business problems, machine learning is also referred to as predictive analytics. |
| 540 | Storage Component | A component used by the computer to store data 700. Examples of storage components 540 include hard drives, CD-ROM, flash drives, and other technologies and services known in the prior art and subsequently developed in the evolving information technology infrastructure. |
| 542 | Database | An application 530 that facilitates the orderly and efficient storage, retrieval, updating, and deleting of data 700. |
| 550 | Network Adapter | A component used by a computer 500 to access a network 600. |
| 600 | Network | An aggregate configuration of information technology components that enable the transmission and receipt of data 700. |
| 602 | Wireless Network | A network 600 that does not rely on wires. |
| 604 | Wired Network | A network 600 that utilizes wires. |
| 610 | Local Network | A network 600 that is limited in geographic scope to the local location 210. |
| 620 | Non-Local Network | A network 600 that traverses a geographic scope beyond that of the local location 210. In many embodiments, the system 300 will utilize the Internet to make some or all of the system's functionality accessible anywhere in the world. |
| 700 | Data | Information that is created and/or cognizable through the system 300. |

TABLE 1-continued

| Number | Name | Definition/Description |
|---|---|---|
| 710 | Input | Data 700 that is used as an input to an application 530 of the system 300. A common example of an input 710 are the sensor readings 720 captured by sensors 400. |
| 712 | Rules | Data 700 in the form configurable processing rules that enable automated processing by the system 300. |
| 714 | External Data Sources | A library of data that is created and stored by an entity different from the entity responsible for the operation of the system 300. |
| 716 | History | Any past interaction with the system 300 can result in history data 716 that is used in future system processing, including but not limited to helping the machine learning module 534 to learn. |
| 718 | Feedback | Comments, ratings, and responses provided by users 100 to the system 300. |
| 720 | Sensor Data | Information captured by a sensor 400. |
| 722 | Attributes | Individual characteristics of a participant 110 that are discernable in a sensor reading 720. |
| 724 | Training Image | Sensor readings 720 such as images or video that are taken outside the context of an event 80 for the purposes of machine learning and comparisons with attributes 722 evident in real time sensor readings 720 captured during the event 80. |
| 725 | Training Video | A sequence of images in rapid succession that are used to train the machine learning module 534. |
| 728 | Event Image | An image captured by a sensor 400 during an actual event 80. |
| 729 | Event Video | A video captured by a sensor 400 during an actual event 80. |
| 730 | User Profile | An ongoing persistent configuration of information about a user 100 of the system 300. |
| 732 | User Submission | Information that is entered into the system 300 by a user 100. |
| 740 | Marker | A specific attribute relating to a monitored participant 112 that is used to enhance the speed and accuracy of the machine learning module 534 in identifying a specified participant 112 within an event image 728 or event video 729. A wide range of markers 740 can be used. Common examples of markers 740 can include the colors 741 of pieces of clothing, a number 742 on a jersey, and a close-up image 743 of the participant. |
| 741 | Color | A subcategory of marker 740 based on the color of clothing, hair, skin, or other attributes. |
| 742 | Number | A subcategory of marker 740 based on the number on a jersey. |
| 743 | Close-Up | A subcategory of marker 740 based on a close-up image of the particular participant 110. |
| 750 | Output | Information that is generated by an application 530 of the system 300. Common examples of outputs 750 can include but are not limited to statuses 760, presentations 770, and certifications 770. |
| 760 | Status | A state or condition relating to a user 100 or event. |
| 770 | Presentation | A display of information. One common form of presentation is computerized visualization of the event 80 in which the targeted participant 110 is highlighted in some visual manner, such as with an indicator 790. Presentations 770 typically include modifications to the image for the purposes of making memes, postings on social media, etc. |
| 775 | Event Data | Data 700 relating to the specific event 80 in which the monitored participant 112 was participating in. For example, the score of the game and other statistics. |
| 780 | Certification | An official acknowledgment within the system 300 as to a particular accomplishment or factual event. Coaches and parents could use the system 300 to convey awards to participants 110 based on their specific accomplishments. |

TABLE 1-continued

| Number | Name | Definition/Description |
|---|---|---|
| 790 | Indicator | An electronic symbol indicating the real time position of a particular participant 110 on a screen visualization of the event 80. The indicator 790 is displayed on the client device 502 of the viewer 120 monitoring and tracking the particular participant 110. |
| 792 | Processed Image | An event image 728 that includes an indicator 790. |
| 800 | COMMUNICATION | An exchange or interaction sent to a user 100 of the system 300. In some instances, a communication 800 is manually initiated from one or more users 100 to be delivered to one or more users 100. In other instances, a communication 800 is automatically generated by the system 300 and delivered to the appropriate user(s) 100 in accordance with the processing rules of the system 300. Common examples of communications 800 including e-mails 810, text messages 820, social media postings 830, automated phone calls 840, automated physical mail 850, and other similar technologies. |
| 810 | E-Mail | Electronic messages conveyed between two dedicated server folders. |
| 820 | Text Message | A SMS (short message service) message or similar messaging technology. |
| 830 | Social Media Posting | A publication on a social media platform such as Facebook, Instagram, Twitter, etc. |
| 840 | Automated Phone Call | A communication 800 that consists of a phone call made by a automated technology. |
| 850 | Automated Physical Mail | A communication 800 that consists of the printing and mailing of a letter, certificate, etc. |
| 900 | METHOD | A process by which one or more users 100 interact with the system 300. |
| 910 | Pre-Event Process | A process by which one or more users 100 interact with the system 300 prior to the event 80. |
| 940 | Event Process | A process by which one or more users 100 interact with the system 300 during an event 80. |
| 970 | Post-Event Process | A process by which one or more users 100 interact with the system 300 after an event 80. |

II. OVERVIEW

The system 300 provides a way for a viewer 120 of an event 80 to access data 700 relating to the event 80. Such data 700 can be created and accessed before, during, and after the event 80 in ways that enhance the experience of the viewer 120 relative to the event 80, and various participants 110 of interest to the viewer 120.

The original inspiration for the conception of the system 300 was to provide a way to provide a grandparent (an example of a viewer 120) with event-specific and even participant-specific data 700 while viewing the event 80. The system 300 can transform a client device 502 such as mobile computer into a machine for enhancing the experience of viewer 120 at an event 80. The system 300 can be particularly useful when the viewer 120 is particularly interested in one or more participants 110 at the event 80. By way of example, the system 300 can be used by grandparent viewers 120 to enhance their experience at an event 80 involving their grandchildren as participants 110. The grandparents may not be particularly knowledgeable about the activities in the event 80, but the grandparents could utilize the system 300 for this lack of knowledge. By way of example, the system 300 can be used to track or monitor the location 200 of the participant 110 on a playing field. This can be done using a data analytics capability 532 which can also be referred to as machine learning. The system 300 can use the DAC 532 to identify the attributes 722 in sensor readings 720 that can most effectively identify the desired participant 110. Different embodiments of the system 300 can utilize different training processes, such as taking detailed still photos of the participant 110 as baseline sensor readings 724 that can be compared to real time video images (a type of sensor reading 720) so that the tracked participant 110 can be identified for the particular viewer 120 with an indicator 790.

Although the system 300 can be implemented in a variety of different ways to suit different levels of expertise and knowledge with respect to a particular event 80, it is anticipated that the system 300 would totally replace current rudimentary methods of attempting to follow a player, neon color shoe laces, contrasting shirt sleeves, etc. In fast paced sports limited knowledge of the game can limit the amount of viewing pleasure that a spectator experiences while at the event 80.

The DAC 532 can identify thousands of unique attributes 722 about a certain athlete 110 to show that athlete's 110 exact location through a software app 530 on a device 502 such as a smart phone or tablet. Given the capability to follow an athlete 110 in real time enhances the spectator's event viewing experience. The system 300 can display an indicator 790 on a screen that reveals the location of an athlete 110 in real-time. This can be viewed as a supporting screen in the same way that one would watch a giant scoreboard at a professional sporting event. The camera on the portable computer can be also the primary device for viewing the event 80, with the viewer 130 using the client device 502 like a television set, with outputs 750 of the system 300 being displayed as an overlay of the visual image receive through the camera on the device.

The viewer 120 could then take a photo or live video of the individual that has been uniquely identified by the app. The system 300 can be implemented to automatically capture photographs and videos in certain circumstances, and can include "auto-focus" which can automatically zoom in to take a burst of photos when the participant is in full vision, app determines when photos taken.

The system 300 can integrate with other sources of data 700. This can be coupled with additional information about the specific game being played as well as more general information about the sport of football, such as the rules, descriptions of different positions, and other potentially useful information. The system 300 can also use other sensors 400 not positioned within the client device 502 of the viewer to capture sensor readings 720. By way of example, individual participants 110 could have sensors 400 embedded in their clothes or uniforms. Such sensors 400 could relate to GPS tracking, microphones to capture sound, or virtually any other type of data 700 that could be potentially useful to the system 300 and its users 100.

The system 300 which can utilize a wide variety of existing technologies and components in different configurations. If tracking sensors 410 are used, tracking they can include tracking devices from Sierra Wireless or Qualcomm utilizing can be used to capture and communicate location data, visual images, and other kinds of data 700 which can be accessed by viewers through a computer 500 such as a smart phone, tablet computer, laptop computer, desktop computer, or some similar device. The system 300 can utilize a wide variety of networks 600.

There are currently numerous GPS tracking technologies that use inertial sensors 500 worn on players to track them on a playing field such as soccer that quantify 150+ performance parameters (outputs 750) through software analytics. Such technologies can be incorporated into the system 100. Parameters such as current speed, G force load, sprint distance, etc. can be used to analyze and improve players performance in a given sport and other physical activities. There can also be one or more sensors 400 such as video cameras 432 usually one camera filming the entire event that downloads into the computer software and disseminated from there. In other contexts, the system 300 can incorporate sensor data 720 such as a surfer's or skier's air height, speed, on other relevant attributes. Such data 700 is utilized by teams, coaches, and players to optimize performance at several skill levels up to professional athletes. These technologies can match up video on one screen with the "dots" of all of the players and current positions on the field on another screen. They can edit the video to create highlights of individual players, but this is done after the fact and used to dissect the individuals past performance. These types of technologies are technical complex to operate and are cost prohibitive for the casual spectator. However, the system 300 can incorporate these technologies in a manner that is easy to use, far less expensive, and in contexts that would be useful to the casual fan, such as a grandparent watching a grandchild compete in an athletic event.

The system 300 can incorporate a variety of technologies in the prior art that provide live streams of competitive events that can be viewed from remote locations a large distance away, e.g. a child's hockey game. However, such technologies do nothing to assist a viewer 120 who is not well versed in the particular sport or event 80. If the viewer 120 does not understand the sport/event it is a challenge to follow the athlete of interest and the flow of the event more generally.

The system 300 can be implemented to further the objects of data access and communication with the casual fan, rather than the more expensive and complex parameters of professional and Olympic level athletics. The system 300 can generate feedback and other outputs 750 in a much less sophisticated but easier to use way than existing tracking and evaluation technologies. The system 300 can build upon or totally replace the current rudimentary methods of attempting to follow a player, such as neon color shoe laces, contrasting shirt sleeves, or other visually distinctive approaches. The system 300 can greatly enhance the viewing pleasure of a viewer 120 who would otherwise be hampered by a limited knowledge of the sport being played.

The system 300 can utilize one or more sensors 400 worn by an athlete (i.e. the participant 110) to show a spectator (the viewer 120) that athlete's exact location through a software app 530 on a computer 500 such as a smart phone or tablet. The capability to follow an athlete in real time can enhance the spectator's event viewing experience, and this capability can be coupled with additional data 700 about the event 80 to further enhance that experience.

The system 300 can utilize efficient sensors 400 and networks 600 to transmit location information (and potentially other types of data 700) back to the viewer 120 utilizing the application 530. The system 300 can utilize a wide variety of different network 600 technology, including but not limited to wideband Wi-Fi, Wi-Fi_33 LE, RFID, or a technology that can ensure the desired results. Conventional information technology networks such as cell phone networks can also be used the communicate data 700 to different components and users of the system 300. The system 300 can couple together the location of an athlete by providing an indicator on the spectator device screen to real-time on-screen visualization of that athlete. The viewer 120 could then take a photo or live video of the individual wearing the uniquely identified sensor 400.

The system 300 does not exist in the prior art, but the system 300 can be created using hardware components that already exist, while incorporating future improvements to those hardware components in future iterations of the system 300. The system 300 can have much more universal appeal than the niche GPS systems that target soccer teams, college recruiting or even performance enhancement of professional athletes. The system 300 can appeal to the typical household in a variety of different athletic, artistic, and other events 80. Even empty nesters have friends and relatives whose activities are attended where the system 300 could be useful. Wi-Fi and other wireless networks 602 will only become more prevalent over time along with the trackable range and battery life in devices/sensors improve. In an age of twitter, snap chat and other "instant feedback" programs, the system 300 could be along those lines where a proud Mom and/or Dad goes home after a game with photos and video of their athlete, dancer, or actor. The system 300 can assist viewers 120 whether the viewer 120 is attending the event 80 in person, or through a live video feed provided through the system 300. The system 300 can be beneficial for use by people with expertise in the particular type of event 80 such as college scouts as well as to those with far more limited expertise in the particular activity.

The system 300 can be implemented and configured to substantially enhance the viewing pleasure of a viewer 120 who is enthusiastic about supporting a particular participant 110, but lacks the knowledge of the particular event 80. Such a viewer 120 will often have problems finding the participant 110 in the context of say a football game unless the participant 110 is on the sideline. If such a viewer had tablet computer, smart phone, or other type of computer 500 to access the system 300, the viewer 120 could point it at the field and a "dot" or other indicia/marker would be displayed on the particular participant 110. Wherever the particular participant 110 goes, so goes the dot/marker. In some embodiments of the system 300, the viewer 120 could zoom in to take a photo or even video. Sensor data 720 could in some embodiments include sound as well, if microphones are embedded into the football helmet.

There are no prior art tracking device technologies that are designed for the purpose of enhancing the average, unknowledgeable spectators viewing experience. The purpose of such prior art technologies is to provide a detailed analysis of an individual's performance, not to better inform the enthusiastic fan with limited knowledge to the particular activity. As such, the system 300 can target a unique market. Grandmothers, grandfathers, aunts, uncles, Moms, Dads, and anyone else attending an event 80 that they know little (or all) about. The system 300 can be a highly desirable tool for a wide variety of events such as dance competitions, cheerleading events and numerous sports such as football, lacrosse, hockey, etc. There are tracking devices/sensors 400 that can be incorporated into the system 300 for interaction with the applications 530 that enable the functionality of the system 300. The system 300 can include additional types of sensor data 720 as improvements to sensor technology are developed. Parameters such as sound, contact velocity, acceleration, etc. can be either captured directly or computed analytically from direct sensor measurements. Athletic performance tracking systems such as Titan 2 can be incorporated into the system 300 or otherwise interfaced with the system 300 in certain contexts. However, those types of technologies are intricate and information is gathered and disseminated to smart devices for analysis for purposes of expert analysis, not the viewing pleasure of the casual fan. The system 300 will typically be used to track your participant 110 in real time to enhance the viewing experience, not to utilize analytics to improve performance.

My Athlete is a prior art app that allows users to live stream a game from your phone and watch from home. The software app allows you to share the video, photos, and live streams with other parents and save all of your athlete's videos in one place. The system 300 can incorporate such functionality, while enhancing the experience by providing additional data 700 to the viewer 120. The system 300 will thus enhance the spectator experience, improving the ability of the viewer 120 to enjoy the event 80. The applications 530 used by the system 300 can provide viewers 120 with an entirely new way to experience an event 80. gives the ability to watch a certain participant in a manner not available with it.

The system 300 can be implemented with broader appeal than the niche GPS systems that target soccer teams, college recruiting or even performance enhancement of professional athletes because there does not need to be a tracking sensor 410 that has to be worn by the participant 110. The system 300 can be implemented using common consumer devices such as a client device 502 with the proper software 530. A large number of households have children who participate in group activities that the system 300 can provide meaningful functionality without requiring anything beyond their smart phones and an enabling application 530. Even empty nesters have friends and relatives whose activities are attended where the system 300 could be useful. In an age of twitter, snap chat and other "instant feedback" apps, the system 300 could be along those lines where proud Mom and Dad's, Grandma's & Grandpa's, go home after a game with photos and video of their athlete. The system 300 solves the problem which is whether in person attending a game or a live video feed sitting on your couch, unless you know the participants game well, you will have minimal participant recognition either way. The system 300 is a valuable tool, whether you are a sport novice or the knowledgeable ex-jock.

The original inspiration for the conception of the system 300 was the mother-in-law of the inventor. While she is very supportive of her grandchildren's activities, her knowledge/interest in sports is limited. By way of example, she has come to several football games, but is rarely able to see her grandson unless he is on the sideline. "His number is 54, he is a guard and is next to the boy who hikes the ball." There can be momentary recognition of where the grandson is only to have the ball hiked and from her perspective he is lost in the action. If such a grandparent had the system enabled by an app on her tablet they could point it at the field and after a brief learning period, would "bracket" the grandson to show his exact location. Wherever the grandson goes so go the brackets. She could zoom in to take a photo or even video of him.

There are no other tracking device systems in the prior art that are designed for the purpose of enhancing the average, unknowledgeable spectators viewing experience. The purpose of the GPS based systems is analysis of an individual's performance. The system 300 targets a unique consumer. Grandmothers, grandfathers, aunts, uncles, Moms, Dads, anyone attending an event that they know little (or all) about. The system 300 is perfect for events 80 such as dance competitions, cheerleading events and numerous sporting events such as football, lacrosse, hockey, etc. Prior to the contest a photo or photos should be taken of the participant to be identified during the contest. This allows the app to identify thousands of unique characteristics about that particular participant that will be identifiable during the contest. The more time the app has to watch the participant in motion, the more it learns about how to identify them. Over time the app will get "smarter". There is also the possible aspect of "group learning". An example is if 3 people are using the app 530 and are following 3 different participants. Let's say, #54, #11, and #7. While the person following #7 is watching, #54 can cross the screen behind #7 and the app continues to learn about #54 as well as the #7 in frame. 3 people watching from 3 different angles can help the app learn about multiple players as they come in and out of view. Possible future enhancements may include the feature of making a "sports card" that can be shared. This would be done by a sports card "frame" built into the app that frames that photo but what it is really doing is "registering" another data point (picture reference) for the app to learn about that individual. Another possible enhancement is uploading photos from the photo library to help register the participant. If say one family member will be late to a game, another family member could take a photo of the participant 110 and text that photo to the late family member so that the baseline images 724 could be used as a reference/comparison point by the system 300.

In addition to using the system 300 to locate a particular participant 112 at an event 80 or within an image 728 or video 729 of the event, the system 300 can also be used to capture even images 728 and event video 729 relevant.

While watching a son, daughter, or other participant 112 play a particular position or perform a specific role in an event 80, the system 300 can be used to convey general information about the event 80 and role to the viewer 120. The role of a participant 110 can held the machine learning process. In some embodiments, the system 300 can be implemented such that statistics specific to the game or event 80 being viewed and the participant 100 being tracked are conveyed to the viewer by the system 300.

As the system 300 can assist viewers 120 capture images of their desired participant 110, those images can then be modified and used in communications 800, such as postings on social media, congratulations for teammates, etc.

Information sharing for the purposes of communications and training of the machine learning module 534 can benefit by the ability of users 100 to form groups 150. An entire family can be given the ability to follow their family member participant. An entire team can be given the ability to follow all of the players on the team. An entire league can be given the ability to follow all events within the league. This can greatly enhance the social aspects of the events, as well as to increase the quantity of data for training purposes.

The system 300 can be implemented to incorporate data from outside the system 300. Such data can relate to the organizing entity of the events 80, sponsors, the particular type of activity, etc. Such data 700 can also be helpful for training purposes.

The system 300 can be used by viewers 120 to view events remotely or to view events 80 as recorded video after the event 80 is over. Participants 100 can view such footage of events to improve their skills for the next event.

A wide range of different sensors 400 can be integrated by the system 300. In some embodiments, the only sensor 400 is the camera 430 in a smart phone used by a viewer. In other embodiments, sensors 400 can be placed at different locations and even different players. Non-visual sensors such as microphones 420 and location/GPS sensors can be used in addition to cameras and video cameras.

The system 300 can be implemented in a wide variety of different information technologies and integrated with different technologies. For example, platforms for the postings of videos, pictures, and audio recording be integrated with the processing of the system.

III. SYSTEM AS A COMBINATION OF SUBPROCESSES

The system 300 can be described as a method 900 that is comprised of two or three subprocesses, a pre-event process 910, an event process 950, and in some embodiments, a post-event process 970.

FIG. 1A is a process flow diagram illustrating an example of a method 910 in which a machine learning module 534 is trained using a training image 724 of a specific participant 112, and the machine learning module 534 is subsequently used to identify that specific participant 112 in an image 728 captured at an actual event 80. This process can be performed for videos as well as still images. FIG. 1B is a process flow diagram illustrating an example of a method similar to the method of FIG. 1A, except that a marker 740 is used in conjunction with the training image 724 to train the machine learning module 534, and the machine learning module 534 is used to create a processed image 792 along with the indicator 790 of the participant 110 from the event image 728. This process can be performed for videos as well as still images.

FIG. 1C is a process flow diagram illustrating an example of a method similar to the method of FIG. 1B, except that a post-event process 970 of communicating the processed image 792 is performed. Different embodiments of the system 300 can involve different graphic modifications and additions for creative expressions. This process can be performed for videos as well as still images.

IV. SYSTEM AS A CONFIGURATION OF COMPONENTS

The three subprocesses described above can be implemented in a wide variety of different systems 300 with a wide variety of different component configurations.

A. Pre-Event Training

Figure 2A:
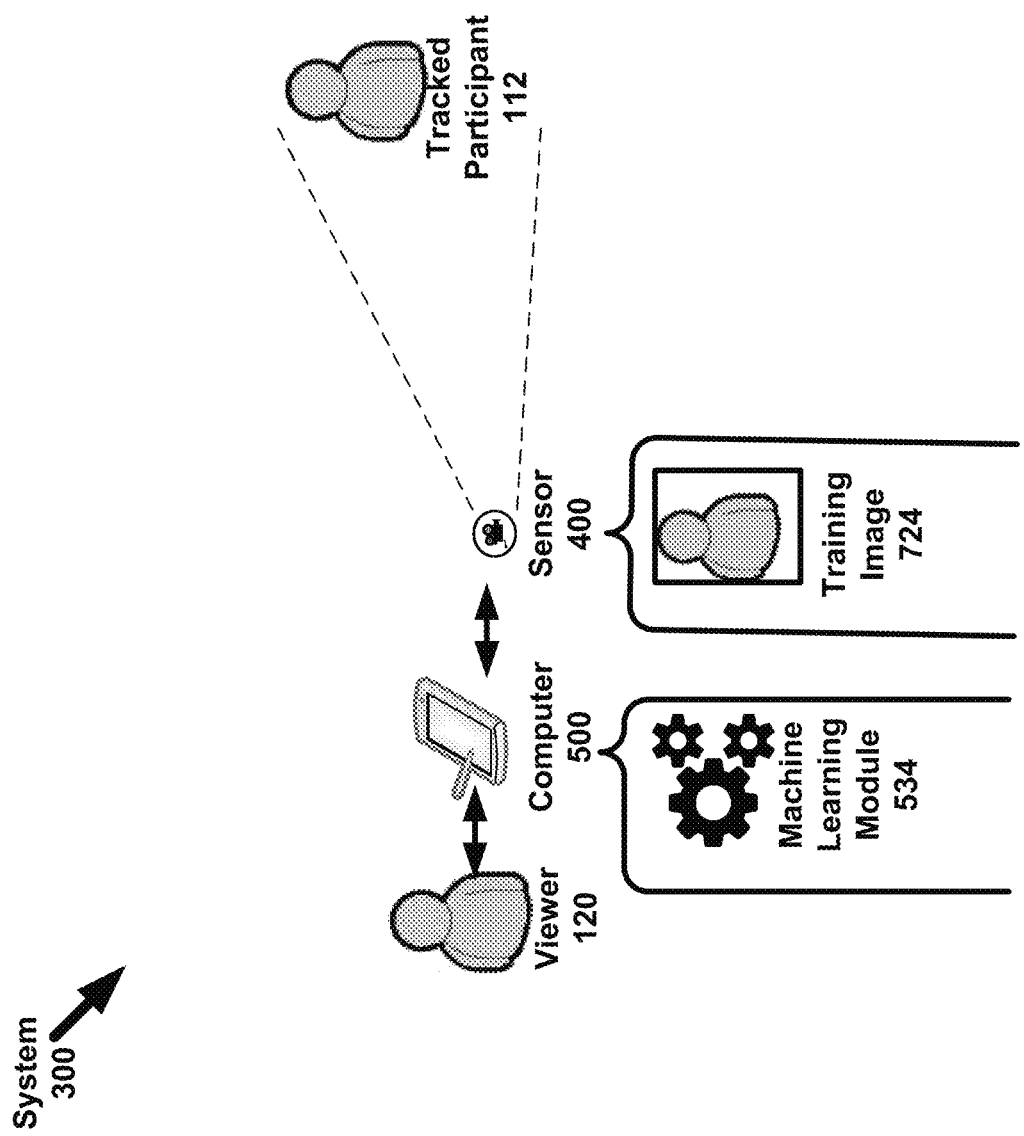
FIG. 2A is a block diagram illustrating an example of a system that captures a training image of a tracked participant in order to train a machine learning module to find that tracked participant in an event image.

FIG. 2A is a block diagram illustrating an example of a system 300 that captures a training image 724 of a tracked participant 112 in order to train a machine learning module 534 to find that tracked participant 112 in an event image 728.

FIG. 2B is a block diagram illustrating an example of a system 300 similar to the system of FIG. 2A, except that a marker 740 is used to help train the machine learning module 534.

FIG. 2C is a block diagram illustrating an example of a system 300 similar to the system 300 of FIG. 2B, except that a user profile 730 and a user submission 732 are also used to help train the machine learning module 534.

Virtually an input 710 of the system 300 and any past output of the system 300 can be useful in training process.

B. Identifying the Participant in an Event Image or Video

Figure 3A:
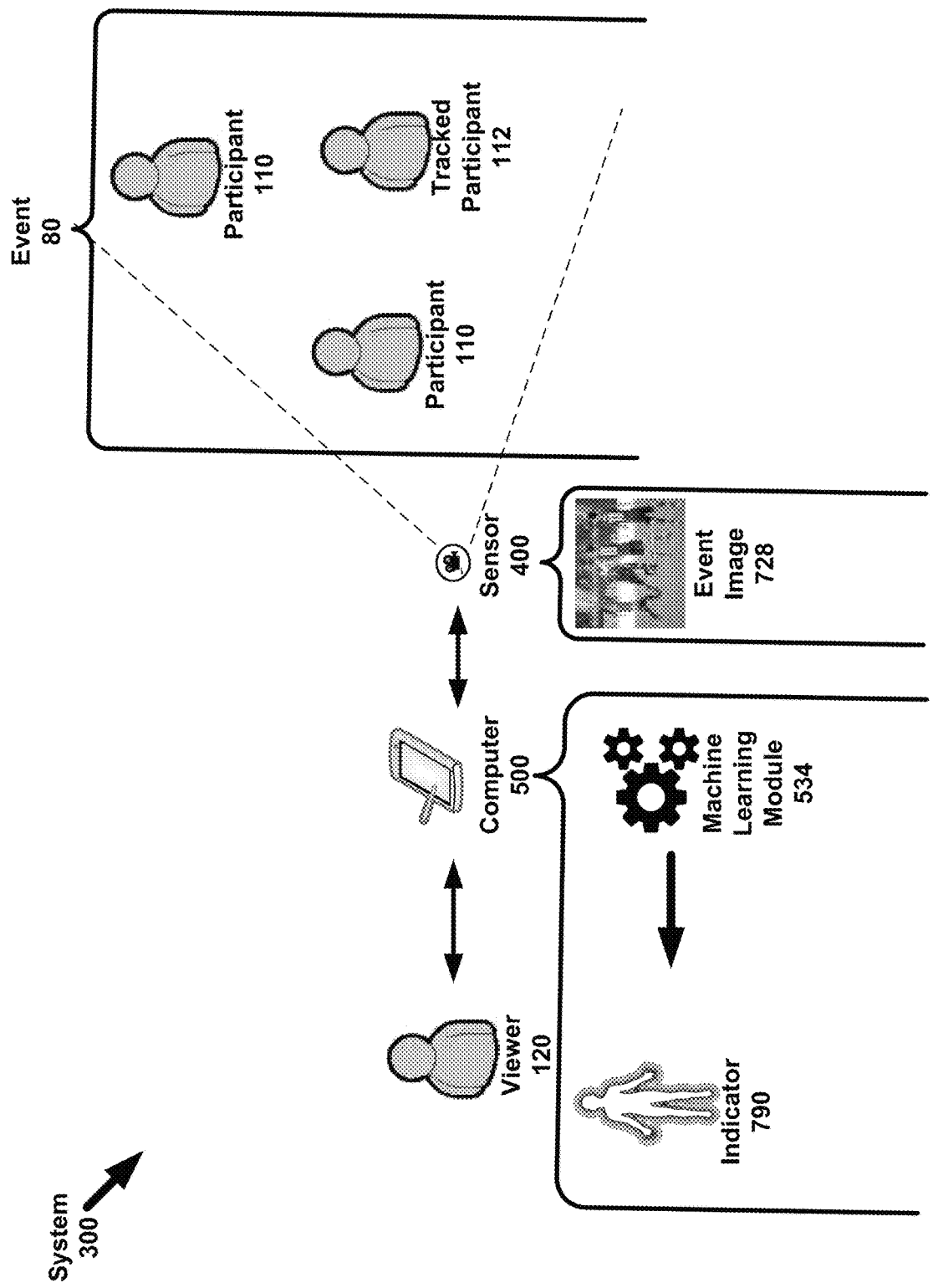
FIG. 3A is a block diagram illustrating an example of a trained machine learning module identifying an indicator of a tracked participant within an event image.

FIG. 3A is a block diagram illustrating an example of a trained machine learning module 534 identifying an indicator 790 of a tracked participant 112 within an event image 728.

Figure 3B:
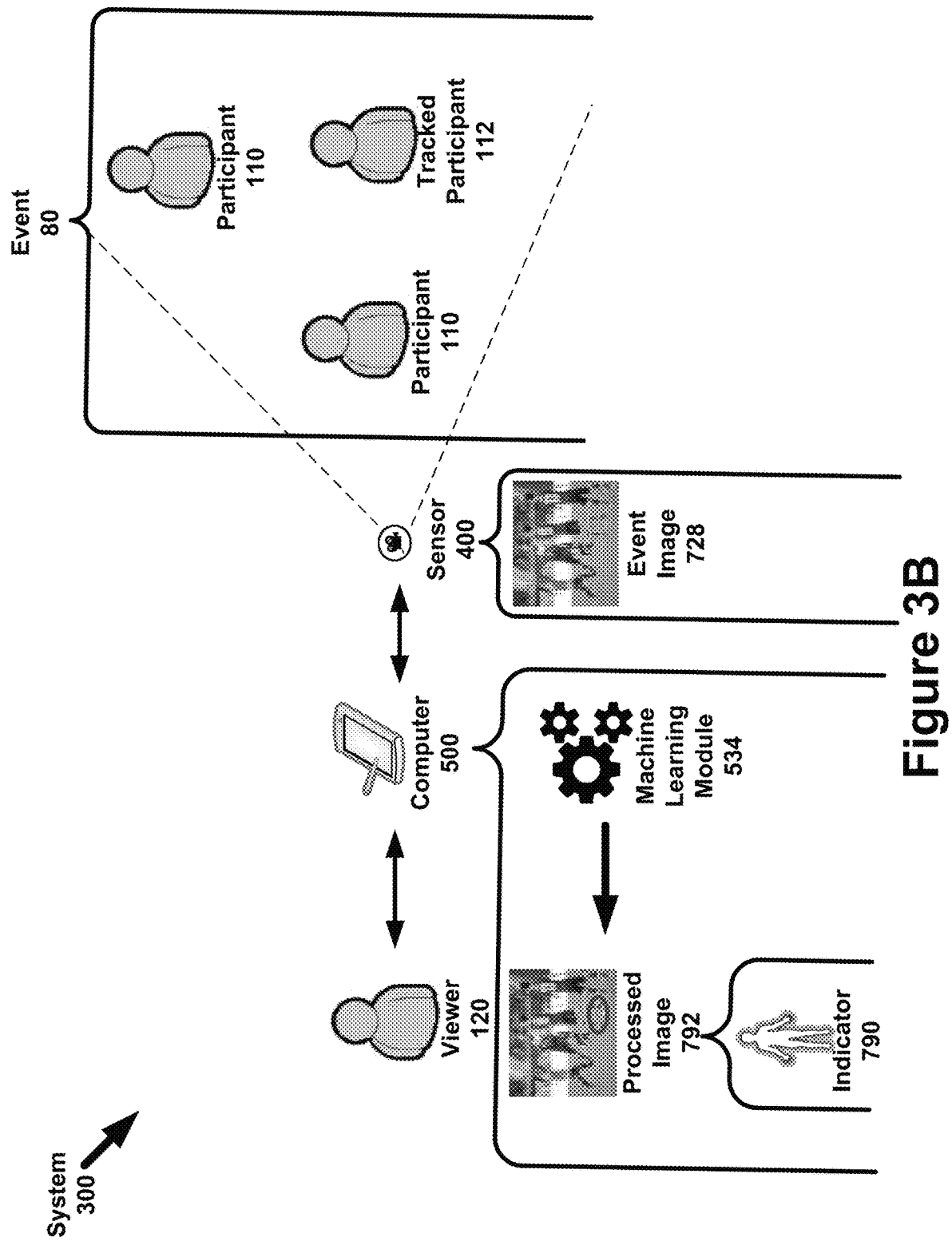
FIG. 3B is a block diagram illustrating an example of a trained machine learning module identifying an indicator within a processed image.

FIG. 3B is a block diagram illustrating an example of a trained machine learning module 534 identifying an indicator 790 within a processed image 792.

V. ENVIRONMENTAL CONFIGURATIONS

The system 300 can be implemented in a wide variety of different information technology and sensor configurations.

Figure 4A:
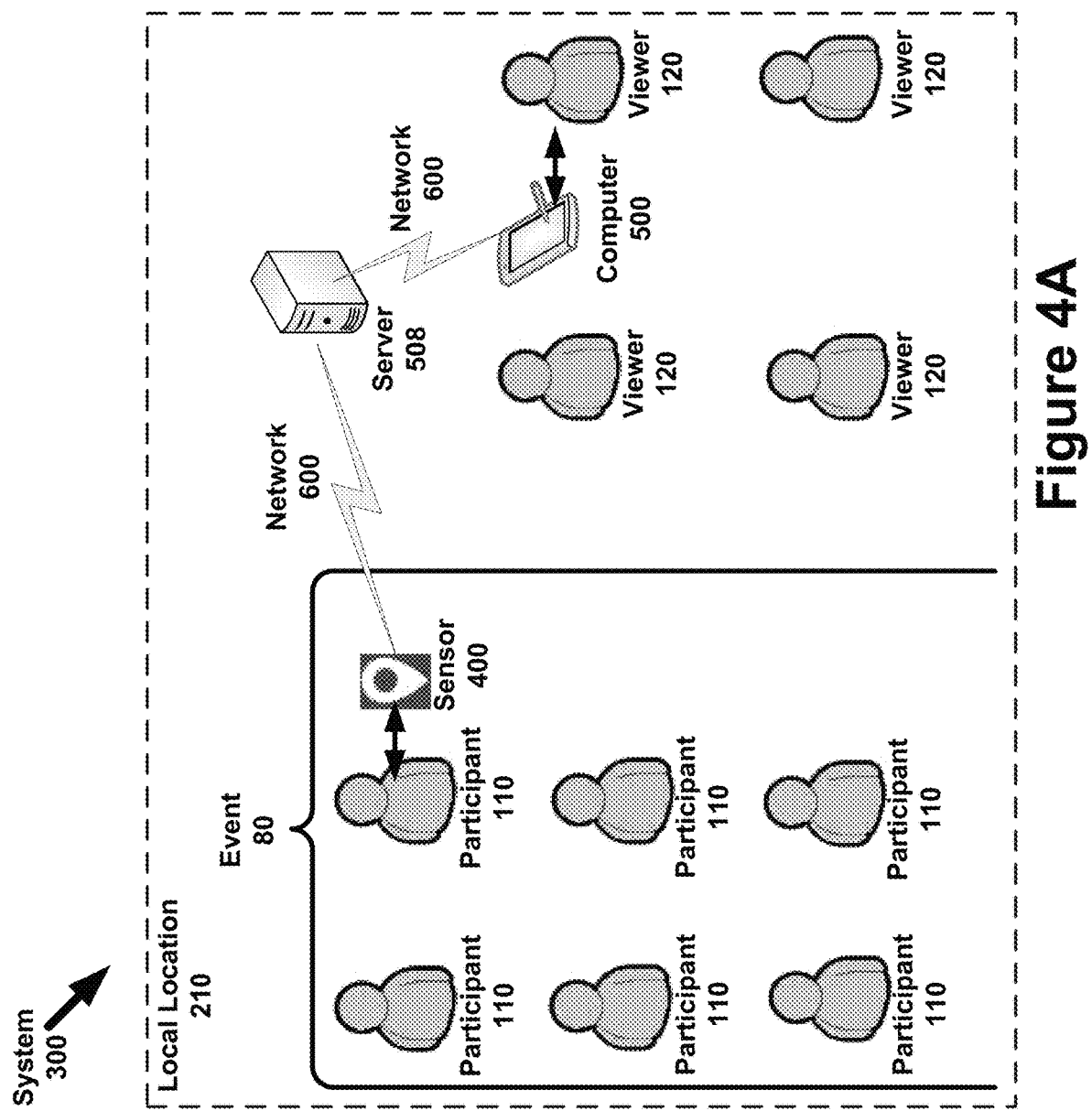
FIG. 4A is a block diagram illustrating an example of the system where all of the components of the system are at the same location as the event itself.

FIG. 4A is a block diagram illustrating an example of the system 300 where all of the components of the system 300 are at the same location 210 as the event 80 itself. In this example there is both a local server 508 and a local client device 502, but in many embodiments, all that is needed is one local client device 502 and no local server 508 will be present.

Figure 4B:
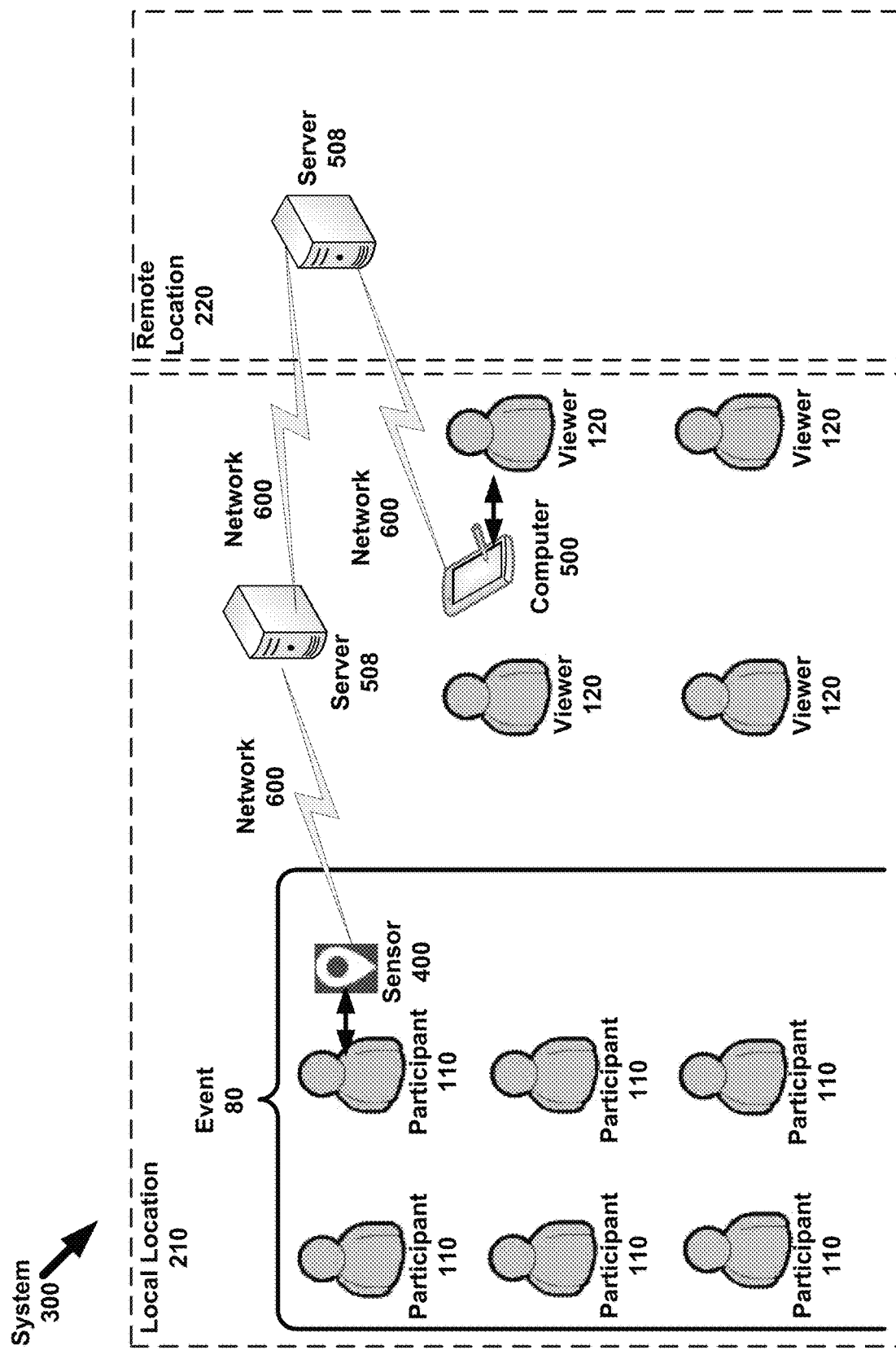
FIG. 4B is a block diagram illustrating an example of a system where both local and remote servers are used to support viewers who are exclusively local to the event.

FIG. 4B is a block diagram illustrating an example of a system 300 where both local and remote servers 508 are used to support viewers 120 who are exclusively local to the event 80.

Figure 4C:
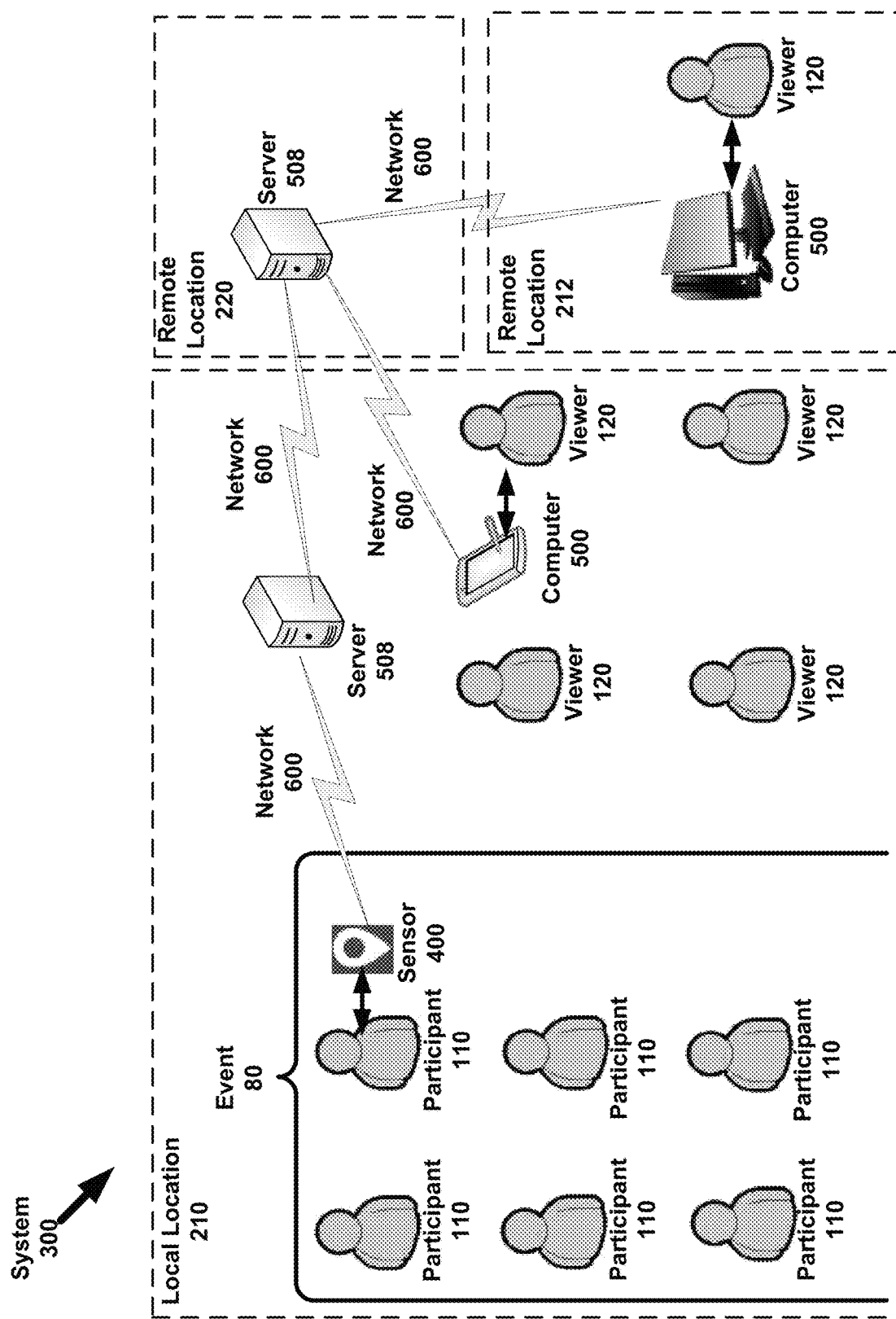
FIG. 4C is a block diagram illustrating an example of a system where viewers utilizing the system to enhance their viewing of the event are located at both local and remote locations.
Figure 4D:
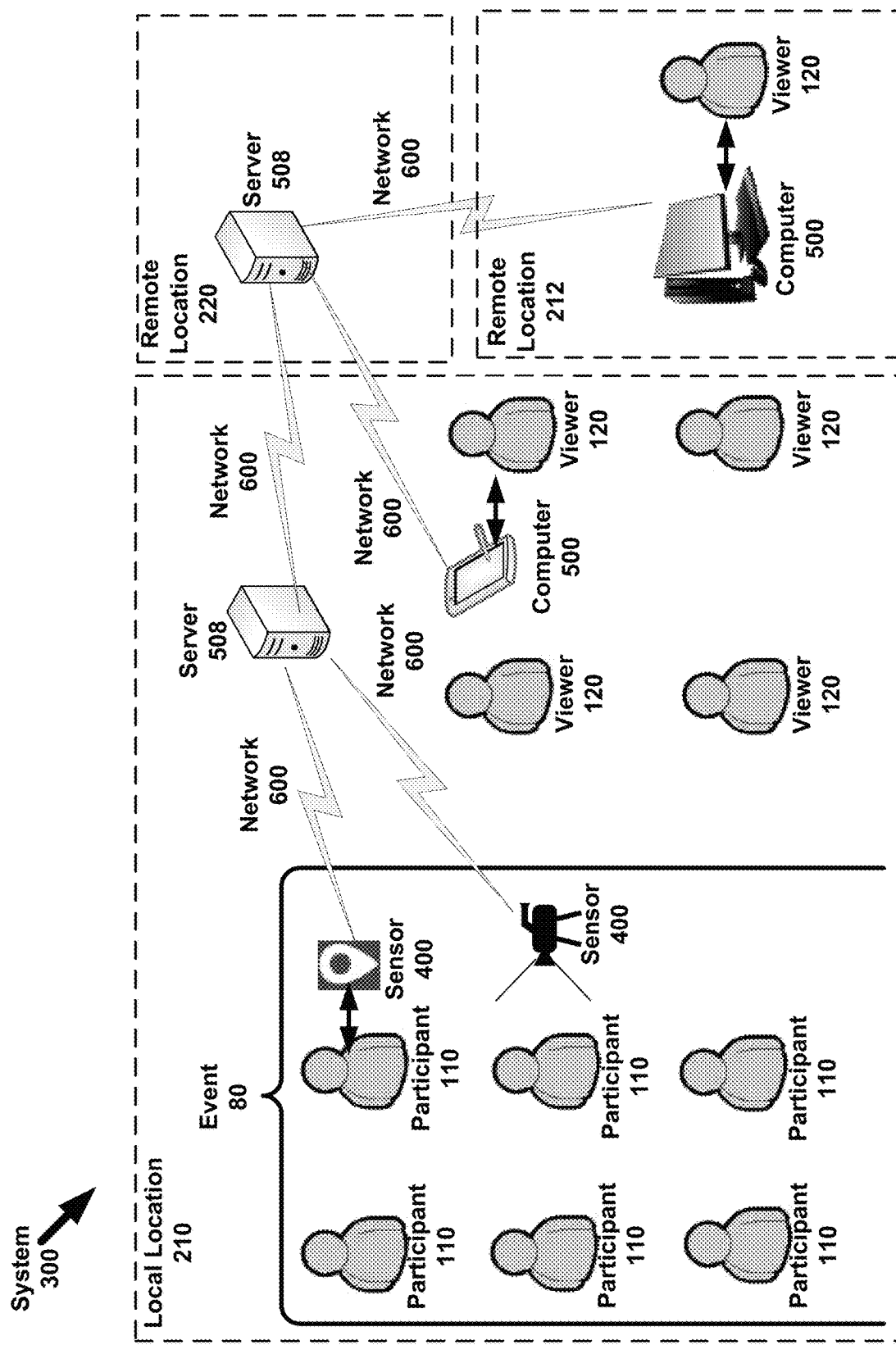
FIG. 4D is a block diagram illustrating an example of a system where participants and viewers at a location are interacting with the system at an event in which a viewer at a remote location is also interacting with the event, participants, and viewers.

FIG. 4C is a block diagram illustrating an example of a system 300 where viewers 120 utilizing the system 300 to enhance their viewing of the event 80 are located at both local 210 and remote locations 220.

VI. INPUT/OUTPUT DIAGRAMS

Different embodiments of the system 300 can be described in terms of the potential inputs 710 to the application 530, and how those configurations of inputs 710 can selectively influence the outputs 750 of the system 300. Those varying configurations of inputs 710 can also impact the training and performance of the data analytics capability 532 of the system 300, including the machine learning module 534.

FIG. 5A is an input-output diagram illustrating an example of an indicator 790 being identified by an application 530 through use of a training image 724 used to train the machine learning module 534 and an event image 728 captured at the event 80.

FIG. 5B is an input-output diagram illustrating an example of a wide variety of inputs 710 that can be used to selectively modify a wide variety of outputs 750.

FIG. 5C is an input-output diagram similar to the example of FIG. 5B, except that the outputs 750 include communications 800 sent out through the use and operation of the system 300.

FIG. 5D is an input-output diagram similar to the example of FIG. 5C, except that the inputs 710 can be aggregate based on groups 150. By way of example, if each of the participants 110 on a sports team decide to pull together their aggregate data 700 to a team group 154 that includes all of the players, that can have a substantial benefit for the purposes of machine learning as well as communications 800 generated by and through the system 300.

VII. FLOW CHART VIEW

A. Pre-Event Processing

Figure 6A:
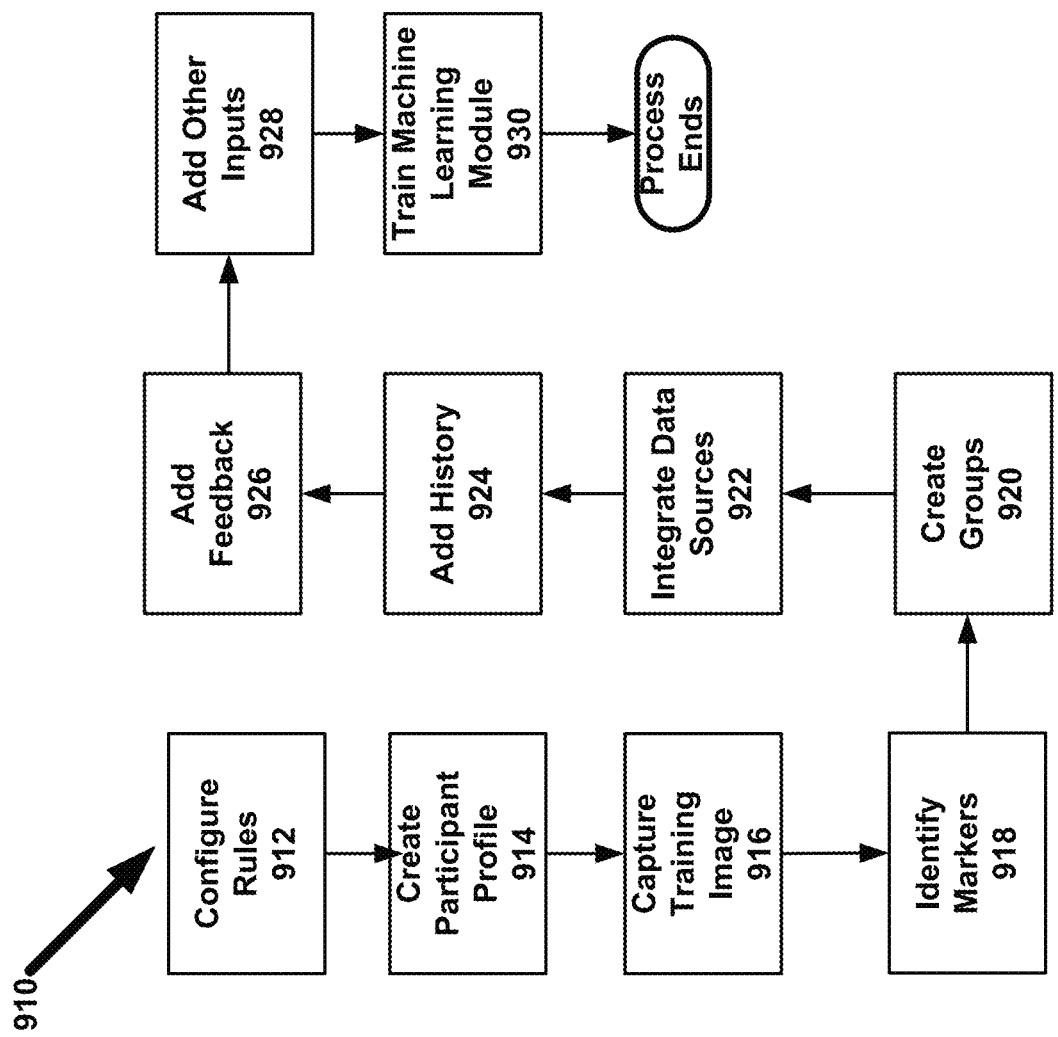
FIG. 6A is a flow chart diagram illustrating an example of a pre-event process that can be implemented using the system.

FIG. 6A is a flow chart diagram illustrating an example of a pre-event process that can be implemented using the system 300.

At 912, processing rules 712 for the system 300 can be defined and configured.

At 914, a user 100 can create a user profile 730. User profiles 730 can distinguish between that user 100 as a viewer 120 and that user 100 as a participant 110, as well as distinctions based on types of events 80.

At 916, one or more training images 724 or training videos 725 can be captured. By capturing a variety of training images 724, one can speed up the training process, as well as to enhance the accuracy of the system 300 in identifying participants 110.

At 918, markers 740 can be submitted along with the training image(s) 724.

At 920, groups 150 can be defined and created.

At 922, outside data sources can be integrated.

At 924, history can be added to the library of data used to train the machine learning module 534.

At 926, feedback can be added.

At 928 other inputs 710 can be added for the purpose of training.

At 930, the application 530 uses the applicable inputs 710 to train the machine learning module 534.

B. During-Event Processing

Figure 6B:
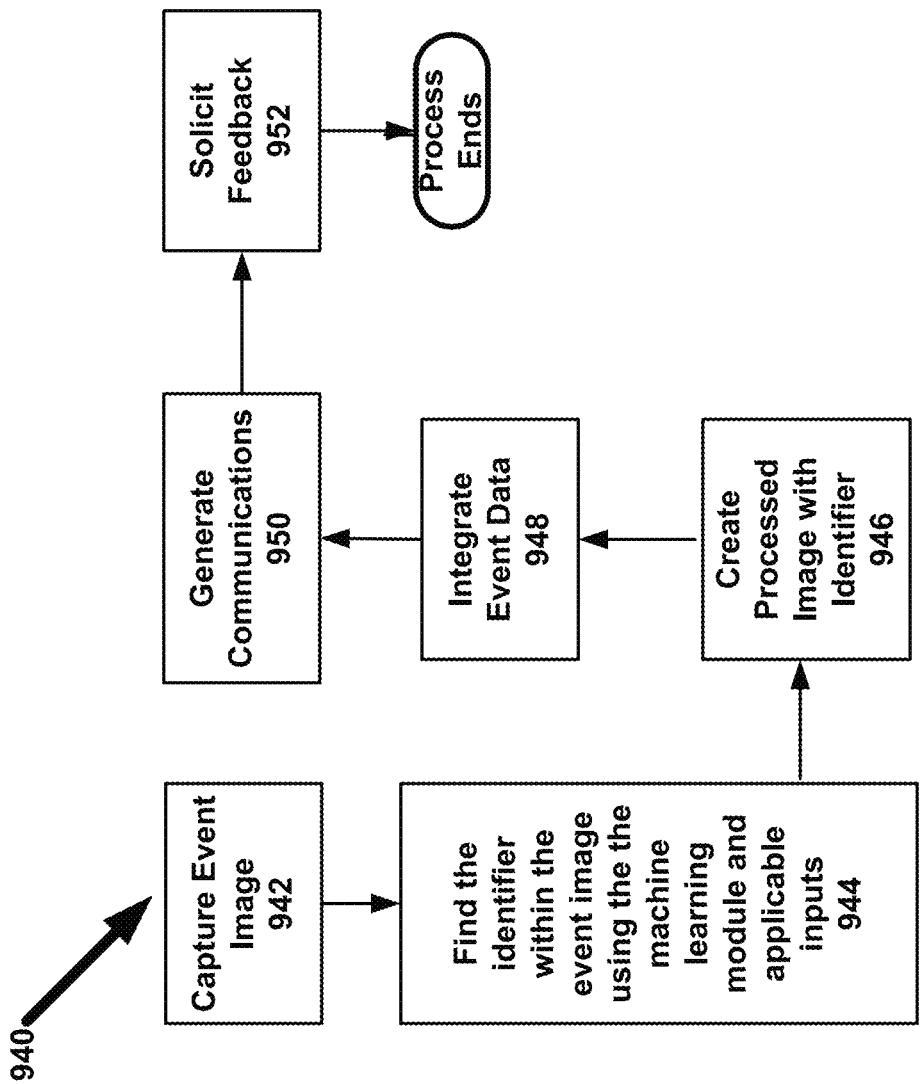
FIG. 6B is a flow chart diagram illustrating an example of a during the event process that can be performed using the system.

FIG. 6B is a flow chart diagram illustrating an example of a during the event process that can be performed using the system.

At 942, an event image or event video is captured.

At 944, the machine learning module 534 is used to identify the sought for participant 110 within the image or video.

At 946, a processed image is created.

At 948, event data can be integrated with the processed images for the purposes of generating communications at 950.

At 952, feedback regarding the event 80 and the performance of the system 300 can also be solicited and received.

C. Post-Event Processing

FIG. 6C is a flow chart diagram illustrating an example of a post-event process that can be performed using the system 300.

The processed image is received at 972. Automated communications can be created at 974 and sent at 976. Customized outputs can be created and sent at 978 and 980. Feedback can be solicited at 986 and received at 988. Further training of the machine learning module 534 can be initiated at 990.

VIII. INTERFACE VIEWS

Figure 7B:
FIG. 7B is a screen shot diagram illustrating an example of an interface being used to display a processed image with an indicator.
Figure 7A:
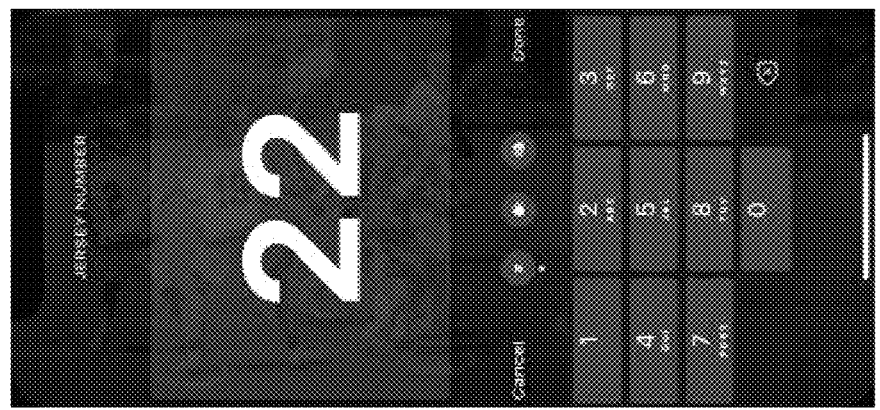
FIG. 7A is a screen shot diagram illustrating an example of an interface being used to submit the jersey number 22 as a marker.

FIG. 7A is a screen shot diagram illustrating an example of an interface being used to submit the jersey number 22 as a marker.

FIG. 7B is a screen shot diagram illustrating an example of an interface being used to display a processed image with an indicator.

Figure 7C:
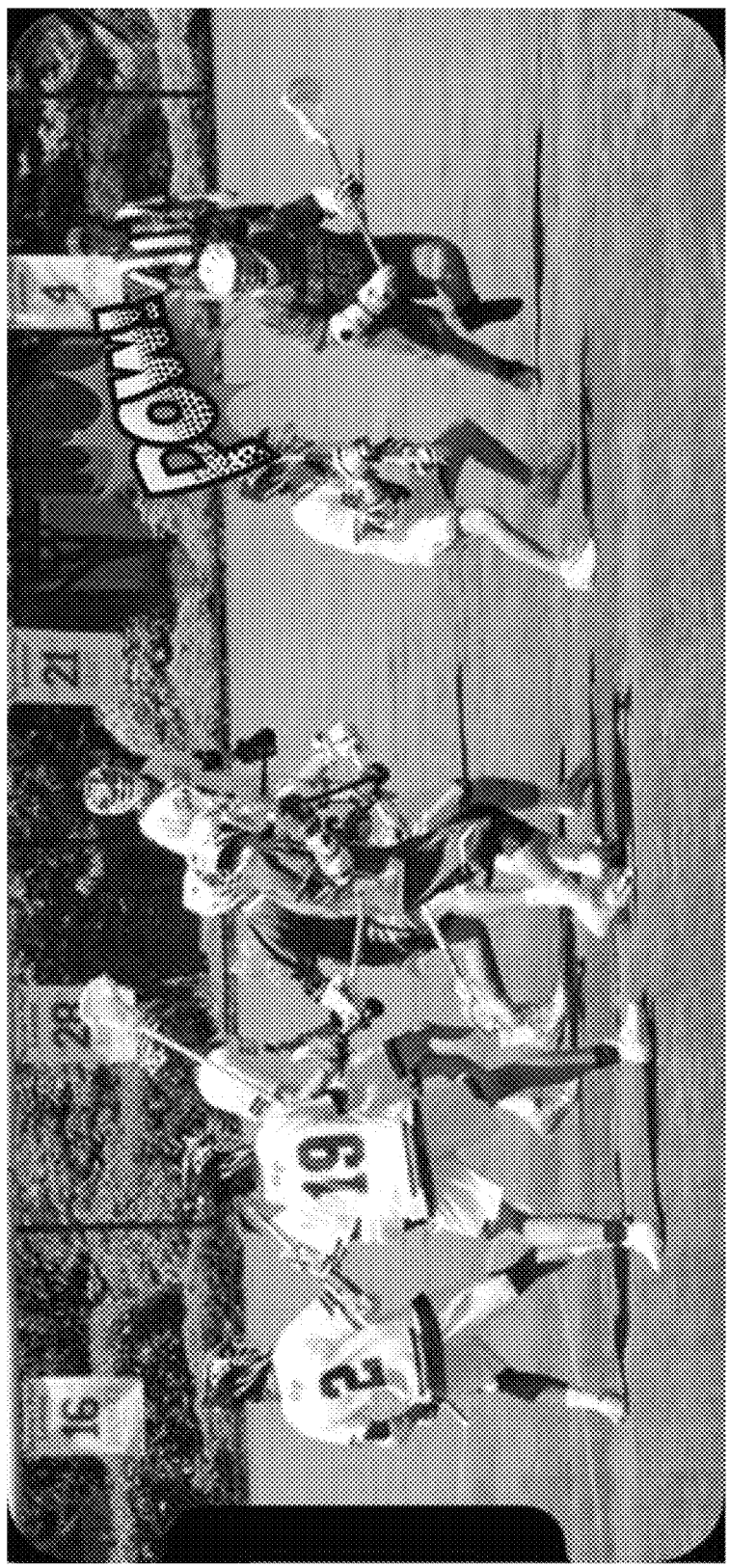
FIG. 7C is a screen shot diagram illustrating an example of an interface being used to display a processed image that includes additional creative modifications for the purpose of disseminating the processed image on social media.

FIG. 7C is a screen shot diagram illustrating an example of an interface being used to display a processed image that includes additional creative modifications for the purpose of disseminating the processed image on social media.

Figure 7E:
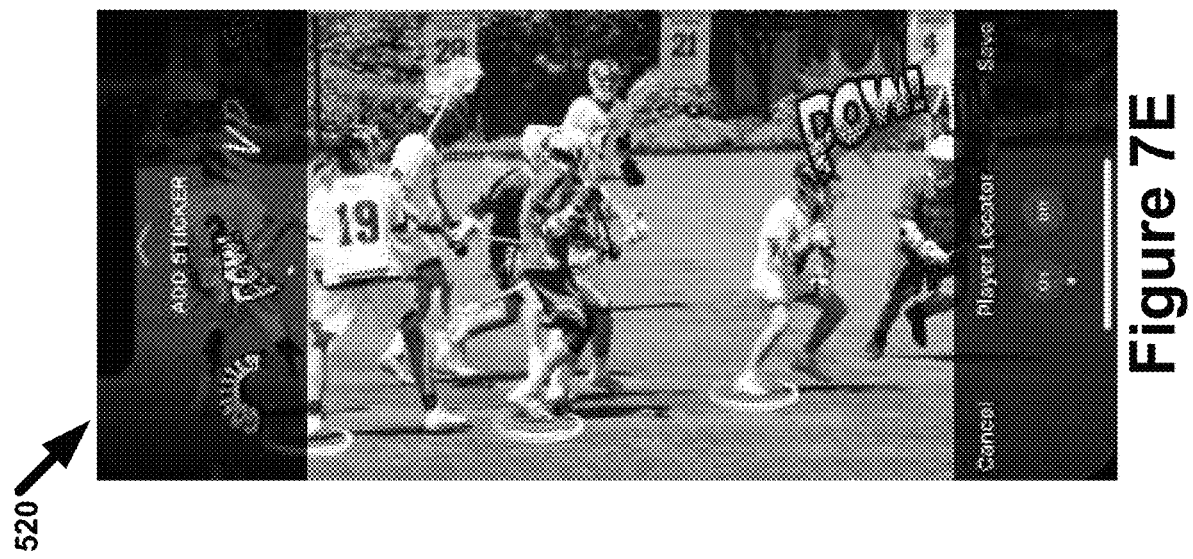
FIG. 7E is a screen shot diagram illustrating an example of an interface being used to display and modify a processed image for the purpose of disseminating the processed image on social media.
Figure 7D:
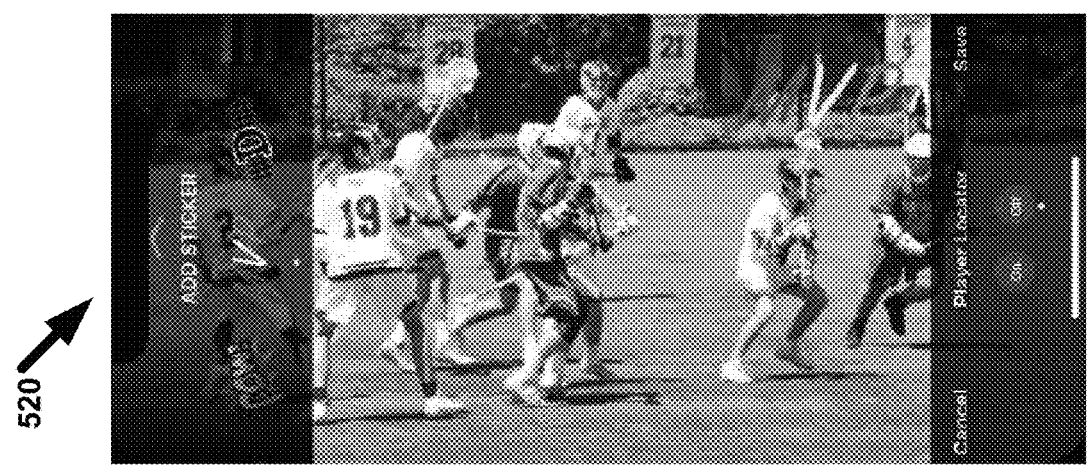
FIG. 7D is a screen shot diagram illustrating an example of an interface being used to display and modify a processed image for the purpose of disseminating the processed image on social media.

FIG. 7D is a screen shot diagram illustrating an example of an interface being used to display and modify a processed image for the purpose of disseminating the processed image on social media.

FIG. 7E is a screen shot diagram illustrating an example of an interface being used to display and modify a processed image for the purpose of disseminating the processed image on social media.

Figure 7G:
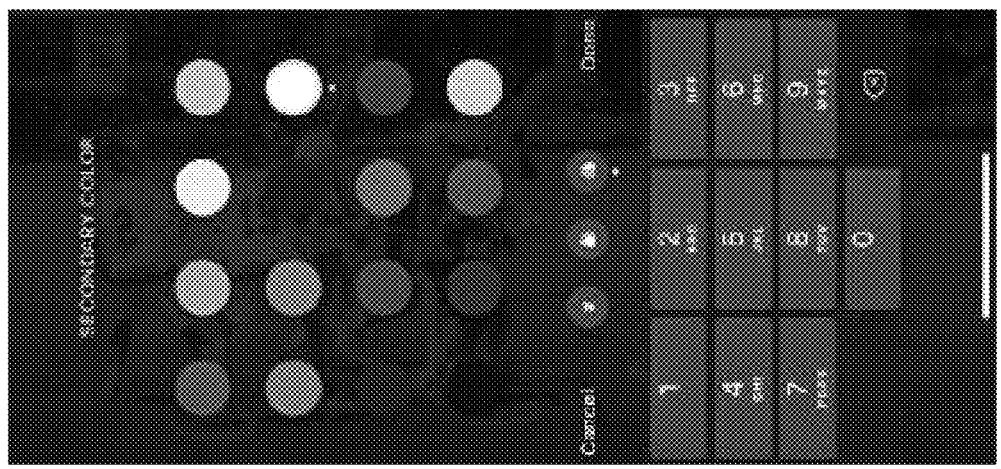
FIG. 7G is a screen shot diagram illustrating an example of an interface being used to create a marker (secondary color) for a tracked participant in order to facilitate machine learning with respect to the location of the participant in an event image.
Figure 7F:
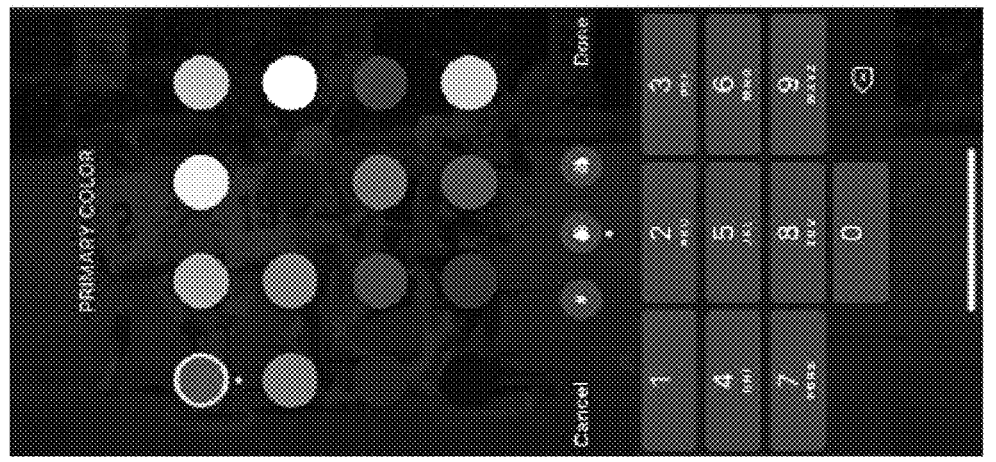
FIG. 7F is a screen shot diagram illustrating an example of an interface being used to create a marker (primary color) for a tracked participant in order to facilitate machine learning with respect to the location of the participant in an event image.

FIG. 7F is a screen shot diagram illustrating an example of an interface being used to create a marker (primary color) for a tracked participant in order to facilitate machine learning with respect to the location of the participant in an event image.

FIG. 7G is a screen shot diagram illustrating an example of an interface being used to create a marker (secondary color) for a tracked participant in order to facilitate machine learning with respect to the location of the participant in an event image.

IX. COMPONENT VARIATIONS AND CATEGORIES

Figure 8A:
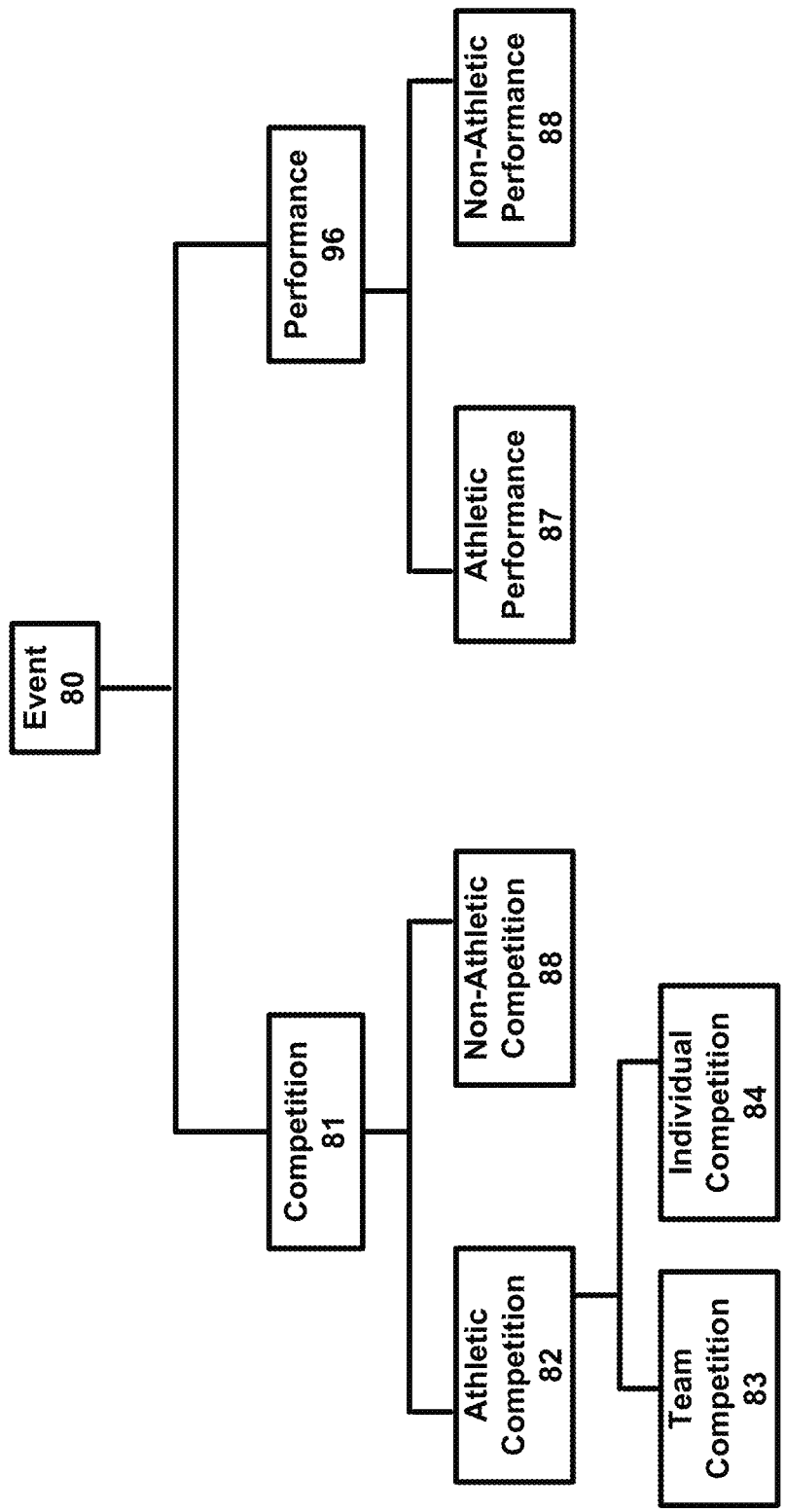
FIG. 8A is a hierarchy diagram illustrating an example of different categories and subcategories of events for which the system can be used to enhance the attendee experience.

FIG. 8A is a hierarchy diagram illustrating an example of different categories and subcategories of events 80 for which the system 300 can be used to enhance the attendee experience.

FIG. 8B is a block diagram illustrating an example of a system 300 as a means to facilitate interactions between a participant 110 and a viewer 120.

FIG. 8C is a block diagram illustrating an example of a system 300 used by a variety of different viewers 120 and participants 110 to interact with each other.

Figure 8D:
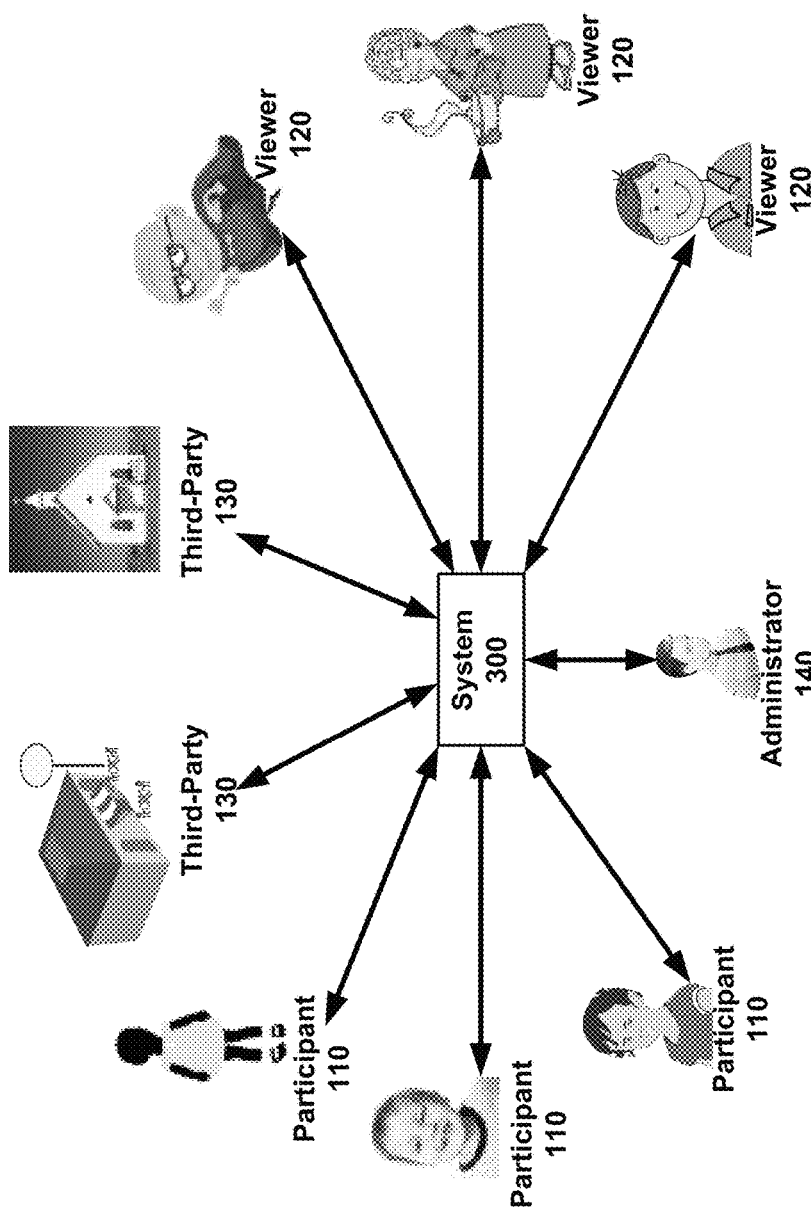
FIG. 8D is a block diagram illustrating an example of a system used by a variety of different viewers, participants, administrators, and third parties to interact with each other.

FIG. 8D is a block diagram illustrating an example of a system 300 used by a variety of different viewers 120, participants 110, administrators 130, and third parties 140 to interact with each other.

Figure 8E:
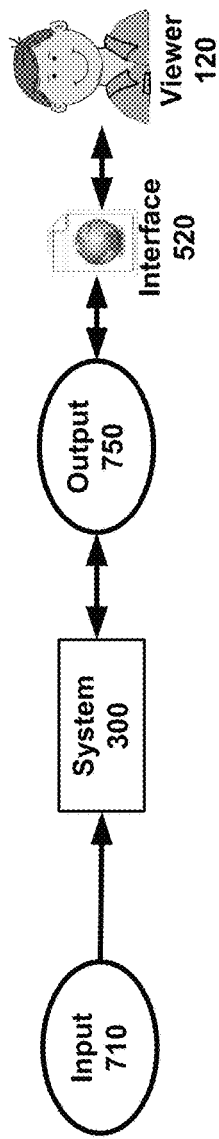
FIG. 8E is a block diagram illustrating an example of a system using a broad category of inputs to create a broad category in outputs where the viewer interacts with the outputs through an interface of the system.

FIG. 8E is a block diagram illustrating an example of a system 100 using a broad category of inputs 710 to create a broad category in outputs 750 where the viewer 120 interacts with the outputs 750 through an interface 520 of the system 300.

Figure 8F:
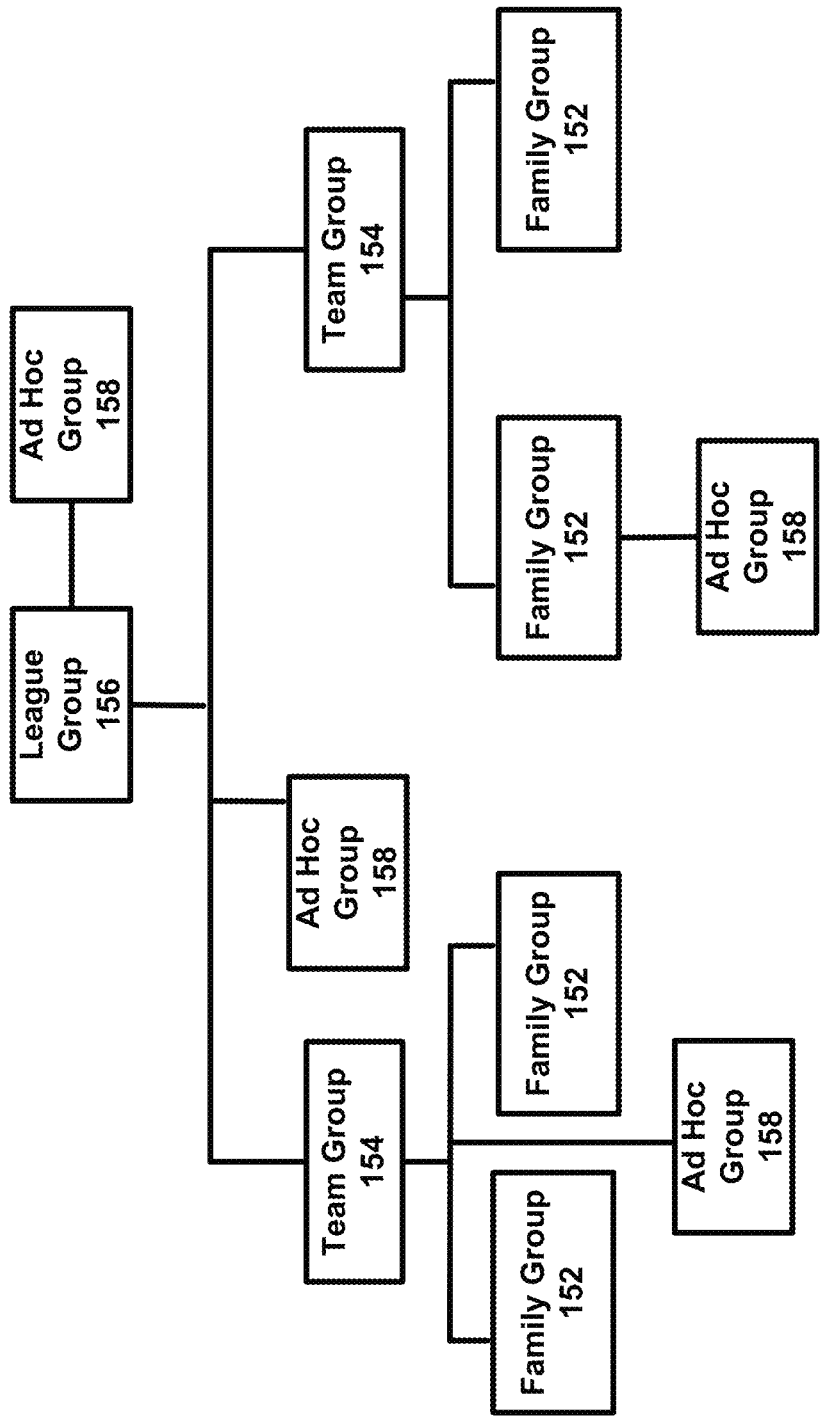
FIG. 8F is a hierarchy diagram illustrating an example of different categories of groups.

FIG. 8F is a hierarchy diagram illustrating an example of different categories of groups 150, including league groups 156, team groups 154, family groups 152, and ad-hoc groups 158.

Figure 8G:
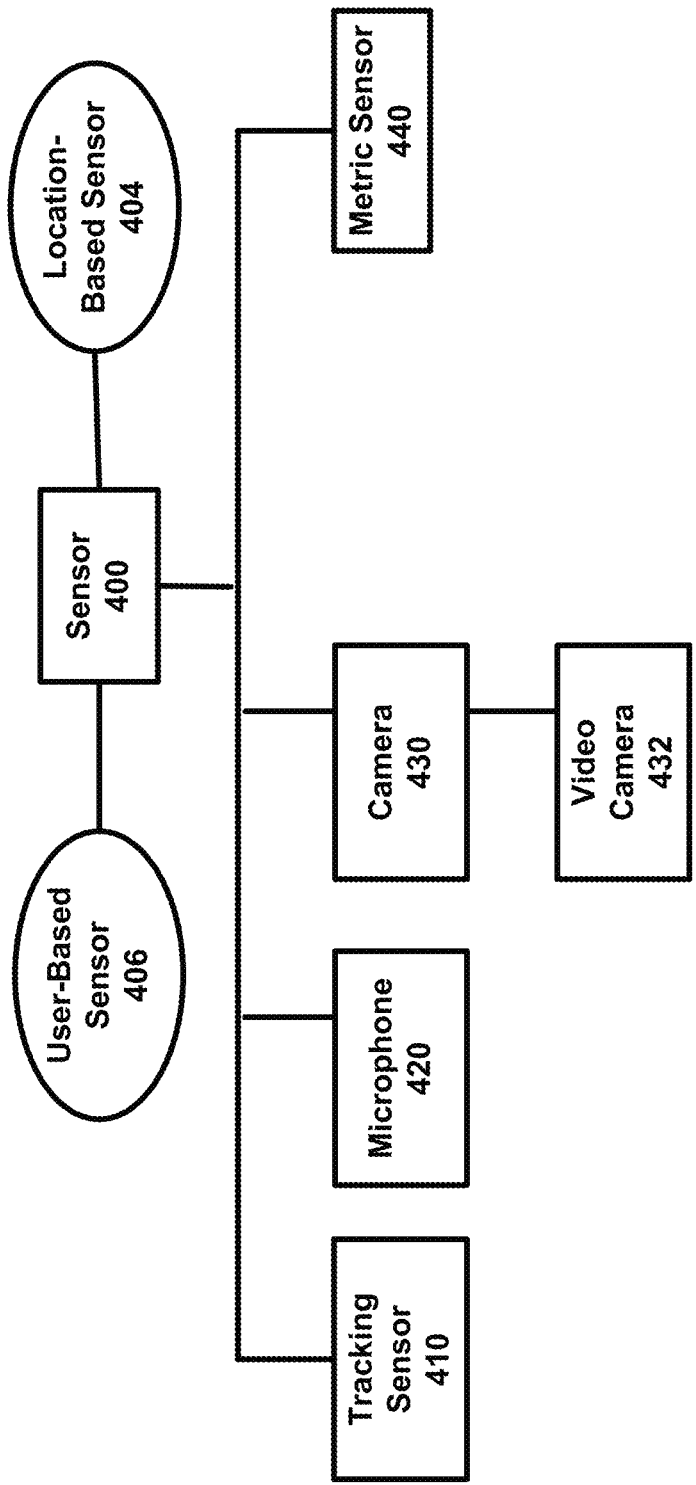
FIG. 8G is a hierarchy diagram illustrating an example of different categories of sensors.

FIG. 8G is a hierarchy diagram illustrating an example of different categories of sensors 400 including tracking sensors 410, microphones 420, cameras 430 (which include but are not limited to video cameras 432), and metric sensors 440.

Figure 8H:
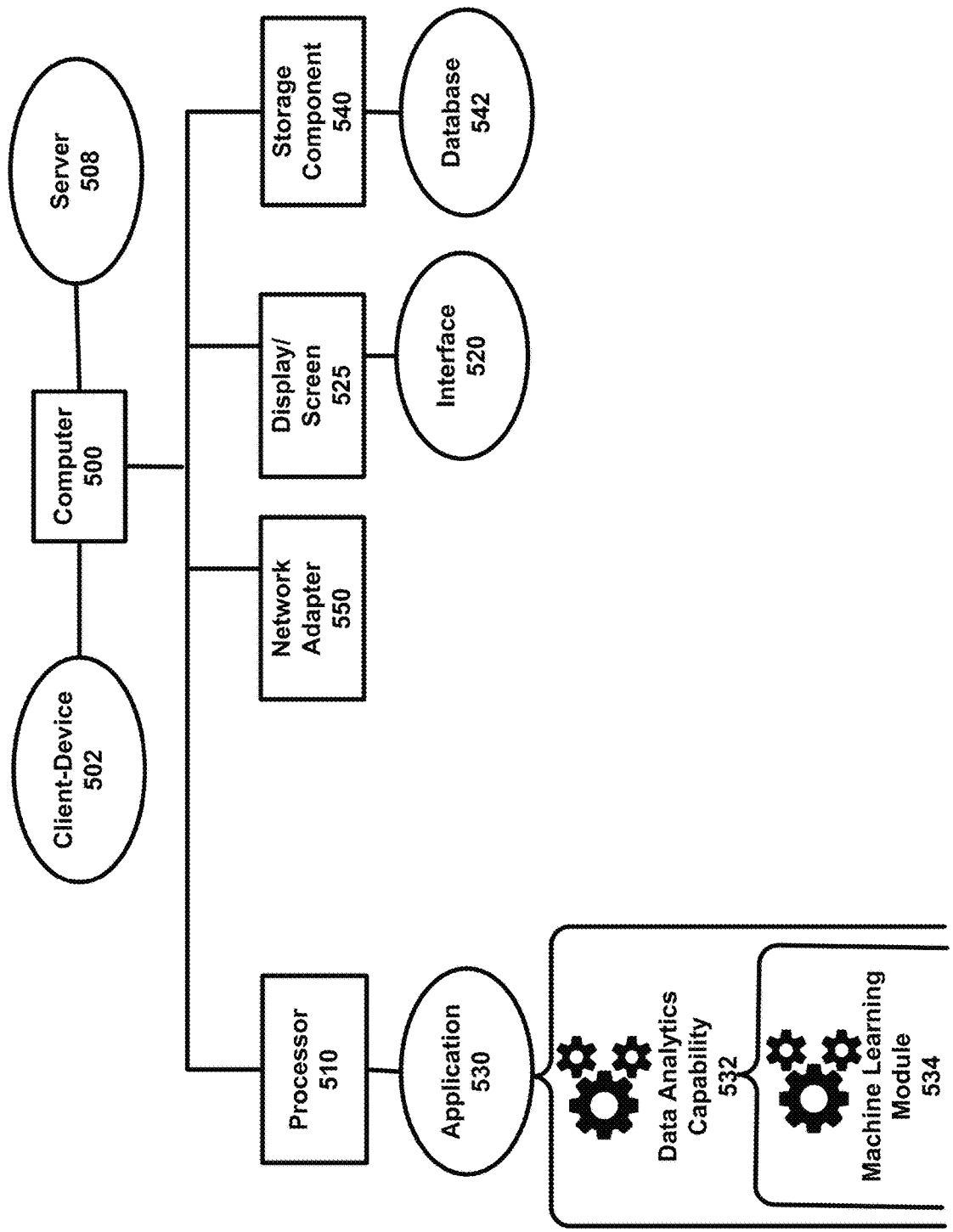
FIG. 8H is a hierarchy diagram illustrating an example of different categories of computers and different components of a computer.

FIG. 8H is a hierarchy diagram illustrating an example of different categories of computers 500 and different components of a computer 500.

Figure 8I:
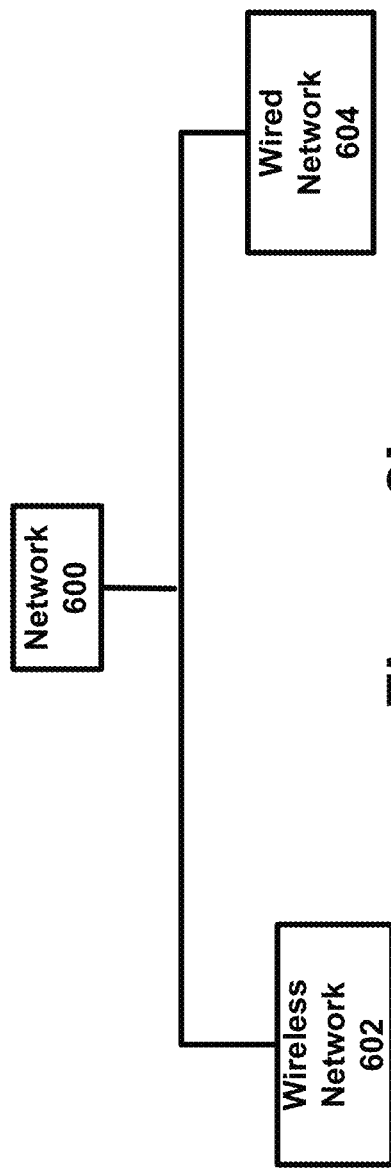
FIG. 8I is a hierarchy diagram illustrating an example of different categories of networks.

FIG. 8I is a hierarchy diagram illustrating an example of different categories of networks 600.

Figure 8J:
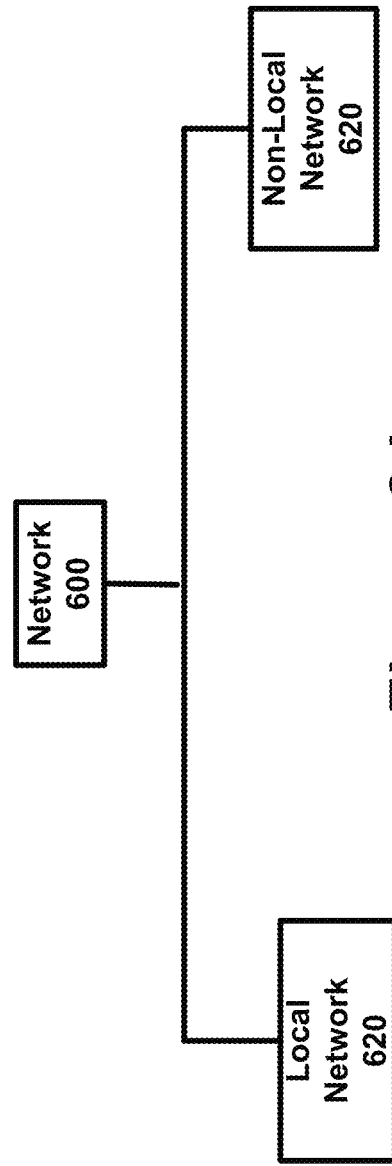
FIG. 8J is a hierarchy diagram illustrating an example of different categories of networks.

FIG. 8J is a hierarchy diagram illustrating an example of different categories of networks 600.

Figure 8K:
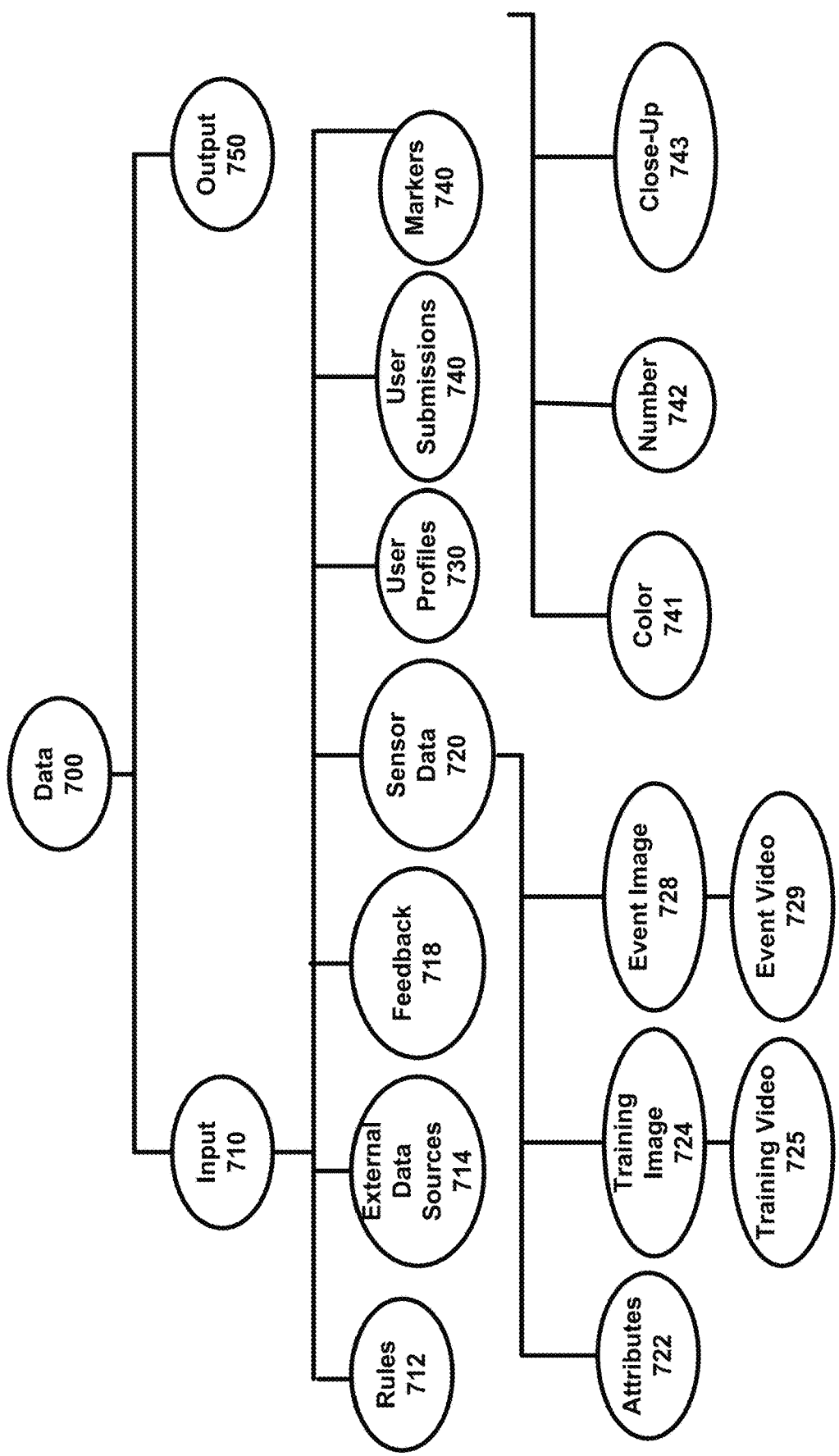
FIG. 8K is a hierarchy diagram illustrating an example of different categories and subcategories of data.

FIG. 8K is a hierarchy diagram illustrating an example of different categories and subcategories of data 700.

Figure 8L:
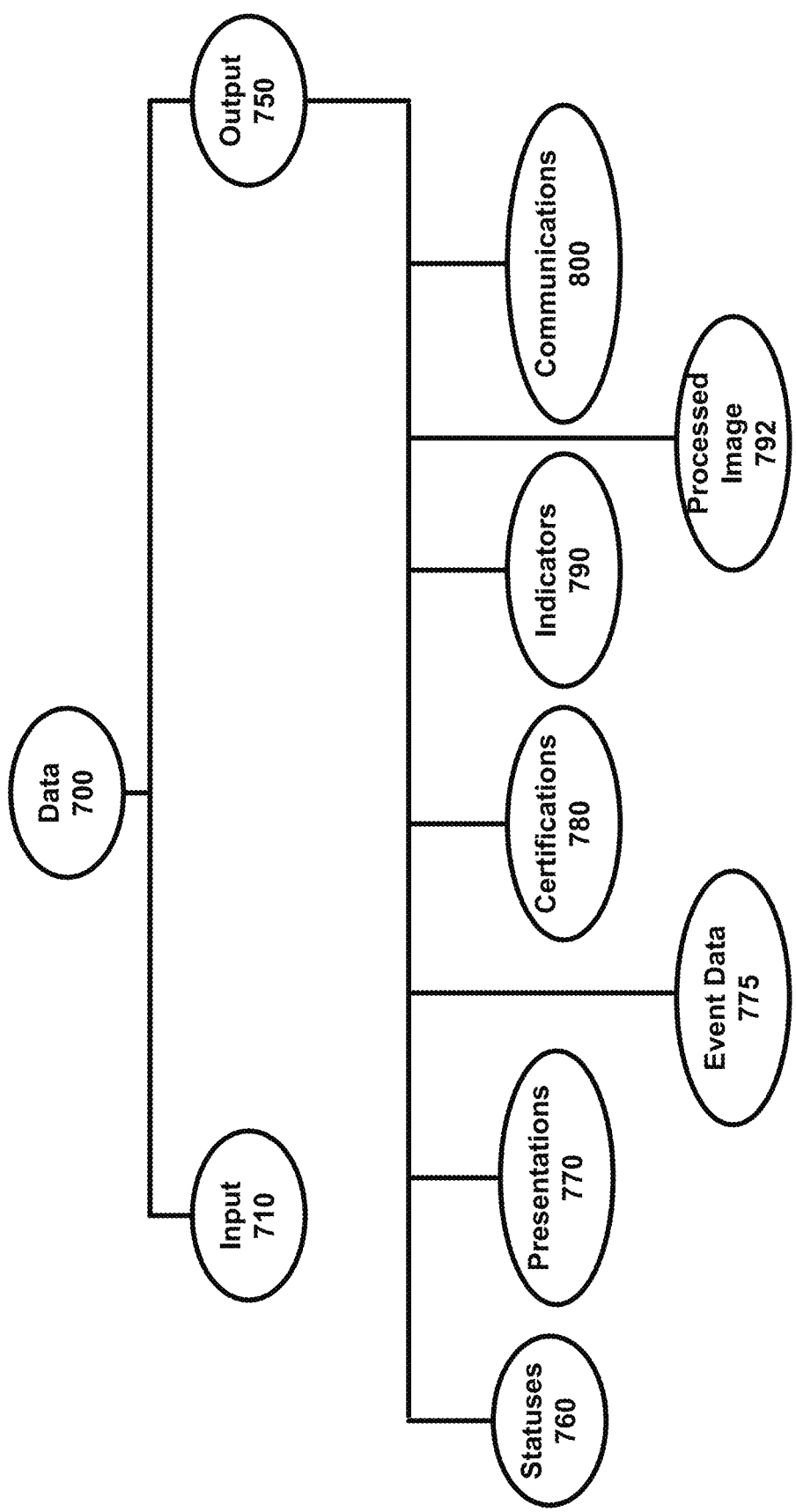
FIG. 8L is a hierarchy diagram illustrating an example of different categories and subcategories of data.

FIG. 8L is a hierarchy diagram illustrating an example of different categories and subcategories of data 700.

Figure 8M:
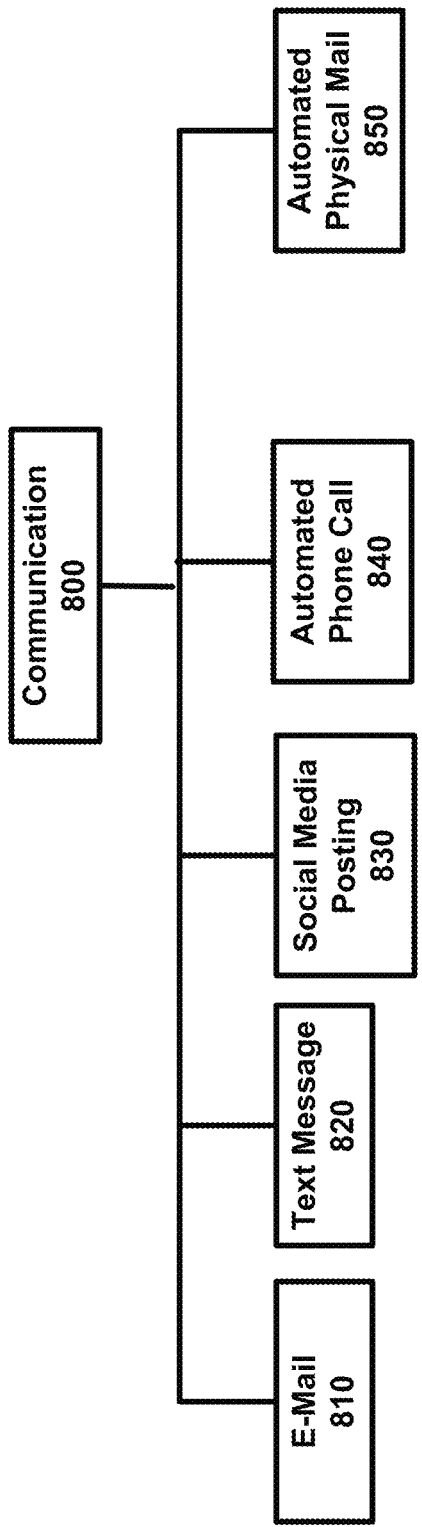
FIG. 8M is a hierarchy diagram illustrating an example of different types of communications.

FIG. 8M is a hierarchy diagram illustrating an example of different types of communications 800.

X. ALTERNATIVE EMBODIMENTS

Different examples of various attributes, components, and configurations that can be incorporated into system 300 are illustrated in the drawings described briefly below. No patent application can expressly disclose in words or in drawings, all of the potential embodiments of an invention. In accordance with the provisions of the patent statutes, the principles, functions, and modes of operation of the apparatus are illustrated in certain preferred embodiments. However, it must be understood that the system 300 may be practiced otherwise than is specifically illustrated without departing from its spirit or scope.

The invention claimed is:

1. A system (300) that uses a training image (724) of a participant (110) to train a machine learning module (534) to identify said participant (110) within an event image (728) captured at an event (80) in an at least a substantially real-time manner by a viewer (120) who is physically present in person at the event (80), said system comprising:
   a sensor (400) that provides for capturing training image (724) of the participant (110) before the event (80) and an event image (728) captured during an event (80);
   a computer (500) that includes a processor (510), a display (525), an interface (520), an application (530), and a storage component (540);
      wherein said processor (510) is adapted to receive said training image (724) and said event image (728) from said sensor (400);
      wherein said processor (510) is configured to run said application (530) which includes said machine learning module (534);
      wherein said application (530) provides displaying said interface (520) on said display (525); and
      wherein said interface (520) displays an indicator (790) on event image (728) to highlight the location of the participant (110) within the event image (728).

2. The system (300) of claim 1, wherein said training image (724) includes a marker (740) that is used to train said machine learning module (534), and wherein said computer (500) is operated by the viewer (120) at the event (80).

3. The system (300) of claim 2, wherein said marker (740) is a clothing color (741) associated with the participant (110), wherein the training of the machine learning module (534) is at least partially performed during the event (80) and wherein the training image (724) is captured at the event (80), and wherein said computer (500) is a mobile client device (502) that is personal to the viewer (120).

4. The system (300) of claim 2, wherein said marker (740) is a clothing number (742) associated with the participant (110), and wherein the participant (110) is a tracked participant (112).

5. The system (300) of claim 2, wherein said marker (740) is a close-up image (743) associated with the participant (110), and wherein the tracked participant (112) is wearing a sensor (400) that is accessible to said system (300).

6. The system (300) of claim 1, said storage component (534) including a user profile (730) associated with the participant (110), wherein said machine learning module (534) is selectively influenced by said user profile (730), and wherein the viewer (120) views said event image (728) through a mobile client device (502) that is not said computer (500) used to train said machine learning module (534).

7. The system (300) of claim 1, wherein said event image (728) is shared with a group (150) during the event (80), and where at least one member said group (150) is also attending the event (80) in person.

8. The system (300) of claim 7, wherein said group (150) is a family group (152), and wherein the participant (110) is wearing a microphone (420) for capturing audio for said family group (152).

9. The system (300) of claim 7, wherein said group (150) is a team group (154), and wherein there are a plurality of participants (110) each wearing a tracking sensor (410) at the event (80).

10. The system (300) of claim 7, wherein said group (150) is a league group (156), and wherein said computer (500) is a client device (502) that includes said sensor (400).

11. The system (300) of claim 1, wherein said computer (500) is a smart phone (502) operated by the viewer (120) and said sensor (400) is a camera (430) on said smart phone (502), wherein the training of said machine learning module (534) is invoked prior to the event (80) by someone who is not the viewer (120).

12. The system (300) of claim 1, wherein a second viewer (120) is located at remote location (220) relative to the event (80).

13. The system (300) of claim 1, wherein the system (300) identifies the participant (110) within the event image (728) during the event (80), and wherein the participant (110) is wearing a person-based sensor (402).

14. The system (300) of claim 1, wherein the system (300) identifies the participant (110) wearing a person-based sensor (402), within the event image (728) during the event (80) in a real-time manner, wherein within the event image (728) the participant (110) is accompanied with the indicator (790).

15. The system (300) of claim 1, wherein the event image (728) is part of an event video (729), wherein the participant (110) is wearing a sensor (400), wherein the participant (110) is associated with a marker (740) on said system (300), and wherein the participant (110) is highlighted within the event video (729) by an indicator (790).

16. The system (300) of claim 1, wherein the system (300) includes a plurality of sensors (400) physically present in the event (80) capturing a plurality of event images (728), said plurality of sensors (400) including a person-based sensor (402) worn by the participant (110), a location-based sensor (404) positioned a pre-determined location at the event (80), and a user-based sensor (406) under the operational control of the viewer (120).

17. The system (300) of claim 16, wherein the participant (110) is wearing a microphone (420) and a camera (430) and wherein said sensor data (714) from said microphone (420) and said camera (430) are selectively accessible by the viewer (120) while viewing the event (80) during the event (80).

18. The system (300) of claim 1, said system (300) further comprising:
- a plurality of sensors (400) and a plurality of computers (500) said plurality of computers (500) including a first computer (500) and a second computer (500), said plurality of sensors (400) including a first sensor (400) for capturing the training image (724) on said first computer and a second sensor (400) for capturing the event image (728) during the event (80) on said second computer.

19. A system (300) that uses a training video (725) of a participant (110) to train a machine learning module (534) to identify the participant (110) within an event video (729) captured at an event (80) in real-time manner by a viewer (120) physically present at the event (80) using the system (300) to view the event (80) as the event video (729) during the event (80), said system (300) comprising:
- a sensor (400) that provides for capturing training video (725) of the participant (110) before the event (80) and an event video (729) during an event (80);
- a computer (500) that includes a processor (510), a display (525), an interface (520), an application (530), and a storage component (540);
- wherein said processor (510) is adapted to receive said training video (725) and said event video (729) from said sensor (400);
- wherein said processor (510) is configured to run said application (530) which includes said machine learning module (534);
- wherein said application (530) provides displaying said interface (520) on said display (525); and
- wherein said interface (520) displays an indicator (790) on said event video (729) to highlight the location of the participant (110) within the event video (729) during the event (80) in an at least substantially real-time manner while the viewer (120) views the event (80) through the system (300).

20. A method (900) for a viewer (120) to view a participant (110) in a real-time manner during an event (80) attended in person by the viewer (120) through a screen (525) on a computer (500), the method (900) comprising:
- using a video camera (432) on the computer (500) for capturing a training video (725) of the participant (110) before the event (80);
- capturing an event video (729) of the participant (110) during the event (80) in a real-time manner while the viewer (120) views the event (80); and
- displaying an indicator (790) of the participant (110) within the event video (729) in real-time manner as the viewer (120) views the event (80) through the video camera (432);
- wherein the computer (500) includes a processor (510), the screen (525), an interface (520) accessible through the screen (525), an application (530), and a storage component (540);
- wherein said processor (510) is adapted to receive said training video (725) and said event video (729) from said video camera (432);
- wherein said processor (510) is configured to run said application (530) which includes said machine learning module (534);
- wherein said application (530) provides displaying said interface (520) on said display (525); and
- wherein said interface (520) displays an indicator (790) on event video (729) to highlight the location of the participant (110) within the event video (729) during the event (80) during the event (80) in an at least substantially real-time manner while the viewer (120) views the event (80) through the system (300).

* * * * *